United States Patent [19]

Deitz et al.

[11] Patent Number: 5,484,899

[45] Date of Patent: Jan. 16, 1996

[54] FIBER-REACTIVE TRIAZINYL DYES HAVING A MONOAZO MOIETY WITH A 2,4-DIAMINOBENZENE SULFONIC ACID COUPLING COMPONENT AND A SECOND CHROMOPHORE

[75] Inventors: Rolf Deitz, Basle; Athanassios Tzikas, Pratteln, both of Switzerland

[73] Assignee: Ciba-Geigy Corporation, Tarrytown, N.Y.

[21] Appl. No.: 237,478

[22] Filed: May 3, 1994

[30] Foreign Application Priority Data

May 6, 1993 [CH] Switzerland .............................. 1391/93

[51] Int. Cl.$^6$ .................... C09B 62/006; C09B 62/08; C09B 62/507; D06P 1/38
[52] U.S. Cl. .................... 534/618; 534/612; 534/617; 534/622; 534/635; 534/636; 534/637; 534/642; 534/655; 534/796; 534/797; 8/549
[58] Field of Search .................... 534/618, 622, 534/635, 636, 637, 642, 655, 796, 797

[56] References Cited

U.S. PATENT DOCUMENTS 4,997,919   5/1991   Schaulin .................................. 534/637

FOREIGN PATENT DOCUMENTS

| 2093085 | 10/1993 | Canada . |
| 0567793 | 11/1993 | European Pat. Off. . |
| 115363 | 5/1991 | Japan .................................. 534/796 |
| 2007247 | 5/1979 | United Kingdom . |

OTHER PUBLICATIONS

Takimoto et al, Chemical Abstracts, 115:210427p (1991).
Derwent Abstract of EP567793 (Nov. 3, 1993).

*Primary Examiner*—Robert W. Ramsuer
*Assistant Examiner*—Fiona T. Powers
*Attorney, Agent, or Firm*—Kevin T. Mansfield

[57] ABSTRACT

The invention relates to compounds of the formula

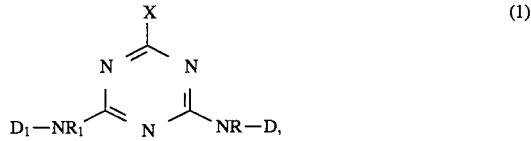

in which the variables are as defined in the claims. The compounds are suitable as dyes, in particular for dyeing and printing cellulosic fibre materials, and produce dyeings and prints with good all-round fastness properties.

17 Claims, No Drawings

FIBER-REACTIVE TRIAZINYL DYES HAVING A MONOAZO MOIETY WITH A 2,4-DIAMINOBENZENE SULFONIC ACID COUPLING COMPONENT AND A SECOND CHROMOPHORE

The present invention relates to novel fibre-reactive dyes which are suitable for dyeing cellulosic fibre materials from an aqueous bath and for printing cellulosic fibre materials.

The invention relates to compounds of the formula

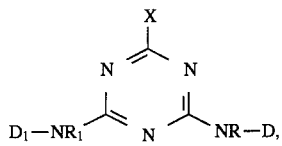  (1)

in which D is a radical of the formula

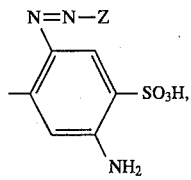  (2)

$D_1$ is the radical of a monoazo, polyazo, metal complex azo, anthraquinone, triphendioxazine, phthalocyanine or formazan chromophore, X is fluorine, chlorine, bromine, 3-carboxypyridin-1-yl, 3-carbamoylpyridin-1-yl, substituted or unsubstituted amino, hydroxyl, $C_1$—$C_4$alkoxy, phenoxy, $C_1$—$C_4$alkylthio, morpholino, aryl or aralkyl, R and $R_1$ independently of one another are each-hydrogen or $C_1$—$C_4$alkyl which is unsubstituted or substituted by halogen, hydroxyl, cyano, $C_1$-$C_4$alkoxy, $C_1$—$C_4$alkoxycarbonyl, carboxyl, sulfo or sulfato and Z is a radical of the formula

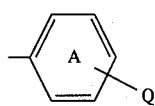  (3a)

or

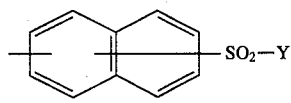  (3b)

or else, if X is fluorine, chlorine or bromine or if the chromophore radical D contains a fibre-reactive group, a radical of the formula

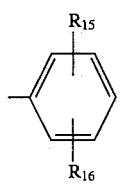  (4a)

or of the formula

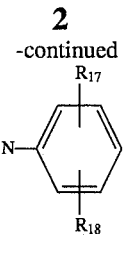  (4b)

Q is a radical of the formula

—$SO_2$—Y  (5a),

—CONH—$(CH_2)_n$—$SO_2$—Y  (5b),

—$(O)_p$—$(CH_2)_m$—CONH—$(CH_2)_n$—$SO_2$—Y  (5c) or

—NH—CO—T  (5d)

Y is vinyl or a radical —CH2—CH2—U and U is a leaving group,

T is α,β-halopropionyl or α-haloacryloyl, n and m independently of one another are an integer from 1 to 6, p is the number 0 or 1, $R_{15}$, $R'_{15}$, $R_{16}$, $R'_{16}$, $R_{17}$ and $R_{18}$ independently of one another are each hydrogen, $C_1$—$C_4$alkyl, $C_1$—$C_4$alkoxy, halogen, carboxyl or sulfo, with the proviso that the substituent $R_{15}$ or $R_{16}$ in formula (4a) is not hydrogen if the other radical $R_{16}$ or $R_{15}$ is sulfo, and the phenyl ring A is unsubstituted or further substituted.

$C_1$—$C_4$Alkyl is generally methyl, ethyl, n- or iso-propyl or n-, iso-, sec- or tert-butyl; $C_1$—$C_4$alkoxy generally includes methoxy, ethoxy, n- or iso-propoxy and no, iso-, sec- or tert-butoxy; halogen is generally, for example, fluorine, bromine or, in particular, chlorine; $C_1$—$C_4$alkoxycarbonyl is generally methoxycarbonyl, ethoxycarbonyl, n- or iso-propoxycarbonyl or n-, iso-, sec- or tert-butoxycarbonyl, preferably methoxycarbonyl or ethoxycarbonyl. Aryl is, for example, phenyl or naphthyl which are unsubstituted or substituted by $C_1$—$C_4$alkyl, $C_1$—$C_4$alkoxy, halogen, carboxyl or sulfo, preferably phenyl which is unsubstituted or substituted by methyl, ethyl, methoxy, ethoxy, chlorine, carboxyl or sulfo. Aralkyl is, for example, benzyl or phenylethyl.

Examples of suitable radicals R and $R_1$ are hydrogen, unsubstituted $C_1$—$C_4$alkyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl and β-sulfatoethyl.

R and $R_1$ independently of one another am each preferably methyl, ethyl or, in particular, hydrogen.

Substituted or unsubstituted amino X in formula (1) is to be understood as meaning, for example, —$NH_2$, N-mono- or N,N-di-$C_1$—$C_4$alkylamino, which are unsubstituted or substituted in the alkyl part, for example by hydroxyl, carboxyl or $C_1$—$C_4$alkoxy, cyclohexylamino or phenylamino or N—$C_1$—$C_4$alkyl-N-phenylamino which are unsubstituted or substituted in the phenyl part, for example by $C_1$—$C_4$alkyl, $C_1$—$C_4$alkoxy, carboxyl, sulfo, halogen or by a radical of the formula (5a), (5b), (5c) or (5d) defined above.

Substituted or unsubstituted amino X is preferably amino, methylamino, ethylamino, carboxymethylamino, β-hydroxyethylamino, N,N-di-β-hydroxyethylamino, cyclohexylamino, o-, m- or p-methylphenylamino, o-, m- or p-methoxyphenylamino, o-, m- or p-sulfophenylamino, 2,4- or 2,5-disulfophenylamino, o-carboxyphenylamino, N-ethyl-N-phenylamino or N-methyl-N-phenylamino, or is phenylamino which is substituted by a radical of the formula (5a) or (5b). Substituted or unsubstituted amino X is particularly preferably amino, β-hydroxyethylamino, N,N-di-β-hydroxyethylamino or o-, m- or p-sulfophenylamino.

$C_1$—$C_4$Alkylthio X is preferably methyl- or ethylthio.

X is preferably chlorine, fluorine, hydroxyl, amino, N-mono- or N,N-di-$C_1$—$C_4$alkylamino which are unsubstituted or substituted in the alkyl part by hydroxyl, phenylamino which is unsubstituted or substituted in the phenyl part by methyl, ethyl, methoxy, ethoxy, carboxyl, sulfo, chlorine or by a radical of the formula (5a) or (5b), methoxy, ethoxy, iso-propoxy, methylthio, ethylthio or morpholino.

X is particularly preferably chlorine, fluorine, amino, β-hydroxyethylamino, N,N-di-β-hydroxyethylamino, o-, m- or p-sulfophenylamino or morpholino. X is especially preferably chlorine or fluorine.

Further substituents carried by the phenyl ring A in formula (3a) are, for example, $C_1$—$C_4$alkyl, $C_1$—$C_4$alkoxy, halogen, carboxyl or sulfo. The phenyl ring A preferably carries no further substituents or 1 or 2 radicals from the group comprising methyl, ethyl, methoxy, ethoxy, chlorine and sulfo. The ring A particularly preferably carries no further substituents or is further substituted by a sulfo group.

$R_{15}$, $R'_{15}$, $R_{16}$, $R'_{16}$, $R_{17}$ and $R_{18}$ independently of one another are preferably each hydrogen, methyl, ethyl, methoxy, ethoxy, chlorine or sulfo. Radicals of the formula (4a) in which $R_{15}$ is sulfo and $R_{16}$ is methyl, methoxy or sulfo are particularly preferred. Radicals of the formula (4b) in which $R'_{15}$ and $R_{17}$ independently of one another are each hydrogen, methyl or methoxy, $R'_{16}$ is hydrogen or sulfo and $R_{18}$ is sulfo are furthermore preferred.

Suitable leaving groups U are, for example, halogen, for example chlorine, acyloxy, for example acetoxy or benzoyloxy, phosphato, sulfato and thiosulfato.

Examples of suitable radicals Y are accordingly vinyl, β-bromo- and β-chloroethyl, β-acetoxyethyl, β-benzoyloxyethyl, β-phosphatoethyl, β-sulfatoethyl and β-thiosulfatoethyl. Y is preferably vinyl or β-sulfatoethyl.

Examples of suitable radicals T are α,β-dichloro- and α,β-dibromopropionyl and α-chloro- and α-bromoacryloyl; preferred radicals T are α,β-dibromopropionyl and α-bromoacryloyl.

n is preferably the number 2, 3 or 4, particularly preferably the number 2 or 3, and especially preferably the number 2.

m is preferably the number 1, 2 or 3 and particularly preferably the number 1 or 2.

p is preferably the number 0.

Q is preferably a radical of the formula

—SO$_2$—Y (5a),

—CONH—(CH$_2$)$_{2-4}$—SO$_2$—Y (5b'),

—(CH$_2$)$_{1-3}$—CONH—(CH$_2$)$_{2-4}$—SO$_2$—Y (5c') or

—NH—CO—T (5d), in which Y is vinyl, β-bromo- and β-chloroethyl, β-acetoxyethyl, β-phenoxyethyl, β-phosphatoethyl, β-sulfatoethyl or β-thiosulfatoethyl and T is α,β-dibromopropionyl or α-bromoacryloyl.

Q is particularly preferably

—SO$_2$—Y (5a) or

—CONH—(CH$_2$)$_{2-3}$—SO$_2$—Y (5b"), in which Y is vinyl or β-sulfatoethyl.

Z is preferably a phenyl radical of the formula (3a) defined above, which carries no further substituents apart from Q or is further substituted by 1 or 2 radicals from the group comprising methyl, ethyl, methoxy, ethoxy, chlorine and sulfo, and in which Q is as defined and as preferred above.

Z particularly preferably is a radical of the formula

(3c)

in which Q is as defined and as preferred above.

The chromophore radicals $D_1$ can contain the substituents customary in organic dyes bonded to their basic structure.

Examples of such further substituents of reactive dyes are: $C_1$—$C_4$alkyl, $C_1$—$C_4$alkoxy, $C_1$—$C_4$alkoxy which is substituted in the alkyl part by e.g. hydroxyl, $C_1$—$C_4$alkoxy or sulfato, such as 2-hydroxyethoxy, 2-hydroxypropoxy, 2-sulfatoethoxy, 2-methoxyethoxy or 2-ethoxyethoxy, acylamino groups having 1 to 8 carbon atoms, in particular alkanoylamino groups and alkoxycarbonylamino groups, such as acetylamino, propionylamino, methoxycarbonylamino, ethoxycarbonylamino or benzoylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di(β-hydroxyethyl)sulfamoyl, N-phenylsulfamoyl, ureido, hydroxyl, carboxyl, sulfomethyl or sulfo and fibre-reactive radicals. The reactive dyes preferably contain one or more sulfonic acid groups.

One or more fibre-reactive radicals contained in $D_1$ are, for example, independently one or more of the radicals Q defined above, and preferably a radical —SO$_2$—Y, in which Q and Y in each case are as defined and as preferred above. A preferred embodiment of the present invention relates to compounds of the formula (1) defined above in which $D_1$ contains no further reactive radical.

$D_1$ is preferably:

a) Dye radicals of a 1:1 copper complex azo dye of the benzene or naphthalene series in which the copper atom is bonded to in each case a metallizable group on both sides in the ortho-position relative to the azo bridge.

b) Dye radicals of a mono- or disazo dye of the formula

D*—N=N—(M—N=N)$_u$—K— (6a),

—D*—N=N—(M—N=N)$_u$—K (6b) or

—D*—N=N—(M—N=N)$_u$—K— (6c), or of a metal complex derived therefrom; D* is the radical of a diazo component of the benzene or naphthalene series, M is the radical of a central component of the benzene or naphthalene series and K is the radical of a coupling component of the benzene, naphthalene, pyrazolone, 6-hydroxy-2-pyridone or acetoacetic acid arylamide series, and in which D*, M and K can carry substituents customary for azo dyes, in particular hydroxyl, amine, methyl, ethyl, methoxy or ethoxy groups, a 2-hydroxyethoxy, 2-sulfatoethoxy, 2-methoxyethoxy or 2-ethoxyethoxy radical, substituted or unsubstituted alkanoylamino groups having 2 to 4 C atoms, substituted or unsubstituted benzoylamino groups, halogen atoms or a fibre-reactive radical, in particular a radical —SO$_2$—Y, in which Y is as defined above; u is 0 or 1; and D*, M and K together contain at least two sulfo groups, preferably three or four sulfo groups.

c) Dye radicals of a disazo dye of the formula

    (7a) or

    (7b), in which D* and D$_1$* independently of one another are the radical of a diazo component of the benzene or naphthalene series and K$_1$ is the radical of a coupling component of the naphthalene series; and in which D*, D$_1$* and K$_1$ can carry substituents customary in azo dyes, in particular hydroxyl, amino, methyl, ethyl, methoxy or ethoxy groups, a 2-hydroxyethoxy, 2-sulfatoethoxy, 2-methoxyethoxy or 2-ethoxyethoxy radical, substituted or unsubstituted alkanoylamino groups having 2 to 4 C atoms, substituted or unsubstituted benzoylamino groups, halogen atoms or a fibre-reactive radical, in particular a radical —SO$_2$—Y, in which Y is as defined above, and D*, D$_1$* and K$_1$ together contain at least two sulfo groups, preferably three or four sulfo groups.

d) Dye radicals of a formazan dye of the formula

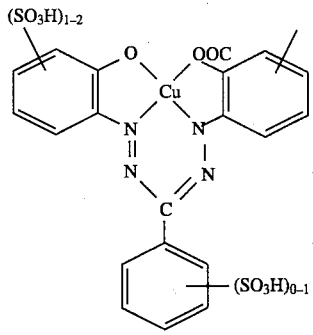

or

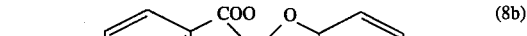

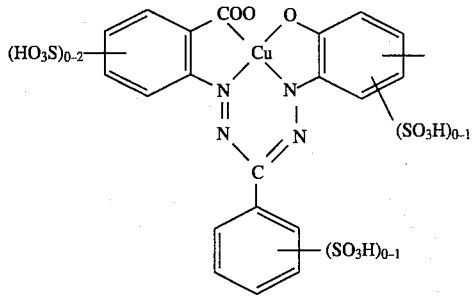

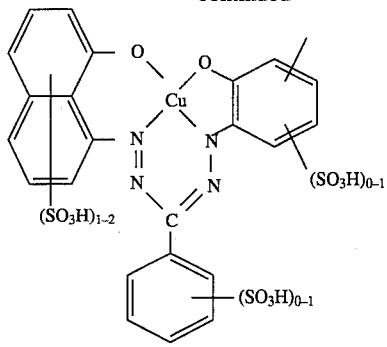    (8c)

or

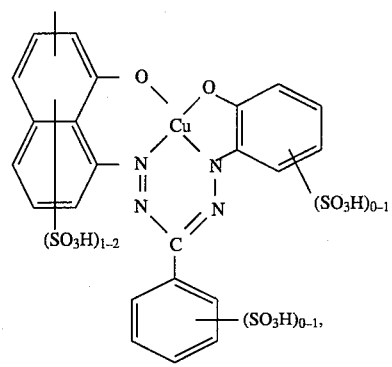    (8d)

in which the benzene nuclei can be furthermore substituted by alkyl having 1 to 4 C atoms, alkoxy having 1 to 4 C atoms, alkylsulfonyl having 1 to 4 C atoms, halogen or carboxyl.

e) Dye radicals of an anthraquinone dye of the formula

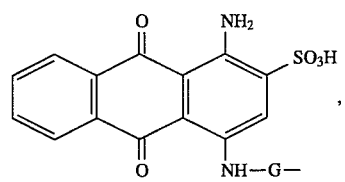    (9)

which G is a phenylene, cyclohexylene, phenylenemethylene or C$_2$-C$_6$alkylene radical; and in which the anthraquinone nucleus can be substituted by a further sulfo group and as phenyl radical G can be substituted by alkyl having 1 to 4 C atoms, alkoxy having 1 to 4 C atoms, halogen, carboxyl or sulfo, and the dye preferably contains at least 2 sulfo groups.

f) Dye radicals of a phthalocyanine dye of the formula

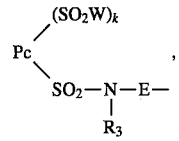    (10)

in which Pc is the radical of a copper or nickel phthalocyanine; W is —OH and/or —NR$_4$R$_5$; R$_4$ and R$_5$ independently of one another are hydrogen or alkyl having 1 to 4 carbon atoms, which can be substituted by hydroxyl or sulfo; R$_3$ is hydrogen or alkyl having 1 to 4 C atoms; E is a phenylene radical, which can be substituted by alkyl having 1 to 4 carbon atoms, halogen, carboxyl or sulfo; or an alkylene radical having 2 to 6 C atoms, preferably a sulfophenylene or ethylene radical; and k is 1, 2 or 3.

g) Dye radicals of a dioxazine dye of the formula

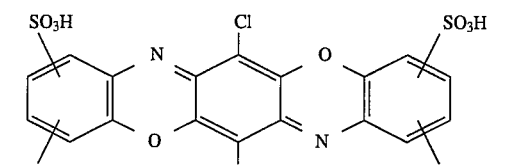

or

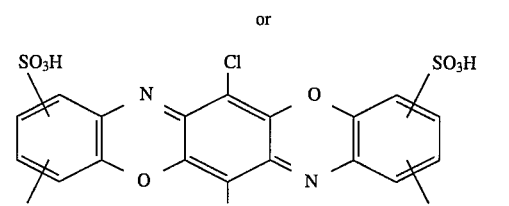

or

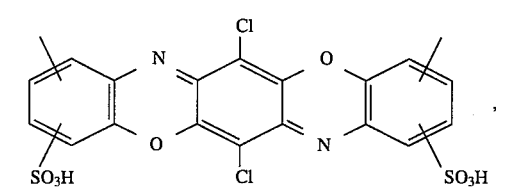

in which E is a phenylene radical, which can be substituted by alkyl having 1 to 4 C atoms, halogen, carboxyl or sulfo; or an alkylene radical having 2 to 6 C atoms; and the outer benzene rings in the formulae (11a), (11b) and (11c) can be further substituted by alkyl having 1 to 4 C atoms, alkoxy having 1 to 4 C atoms, acetylamino, nitro, halogen, carboxyl, sulfo or —SO$_2$—Y, in which Y is as defined above.

Dye radicals D$_1$ of the following formulae (12) to (23) are particularly important for the reactive dyes of the formula (1) according to the invention:

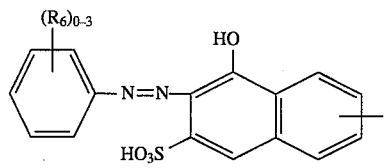

in which R$_6$ is C$_1$—C$_4$alkyl, C$_1$—C$_4$alkoxy, halogen, —SO$_2$—Y, carboxyl or sulfo; and Y is β-sulfatoethyl, β-thiosulfatoethyl, β-phosphatoethyl, β-acyloxyethyl, β-haloethyl or vinyl.

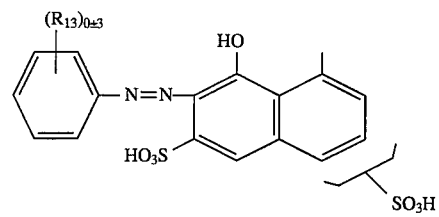

in which R$_{13}$ is C$_1$—C$_4$alkyl, C$_1$—C$_4$alkoxy, halogen, —SO$_2$—Y, carboxyl, sulfo or C$_1$—C$_4$alkoxyanilino; and Y is β-sulfatoethyl, β-thiosulfatoethyl, β-phosphatoethyl, β-acyloxyethyl, β-haloethyl or vinyl.

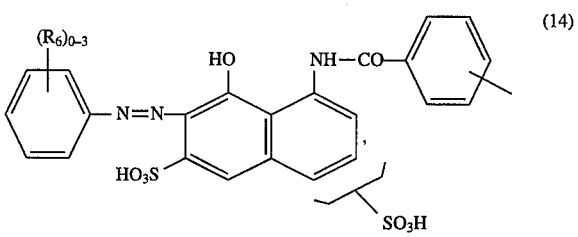

in which R$_6$ is C$_1$—C$_4$alkyl, C$_1$—C$_4$alkoxy, halogen —SO$_2$—Y, carboxyl or sulfo; and Y is β-sulfatoethyl, β-thiosulfatoethyl, β-phosphatoethyl, β-acyloxyethyl, β-haloethyl or vinyl.

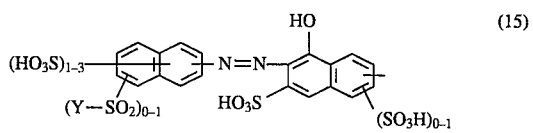

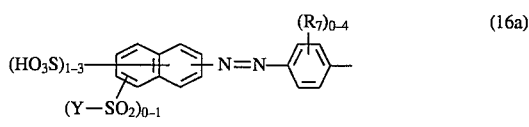

or

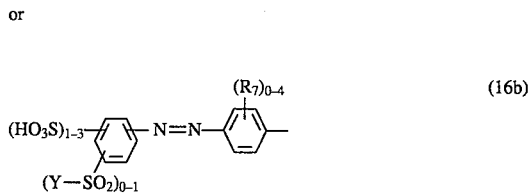

or

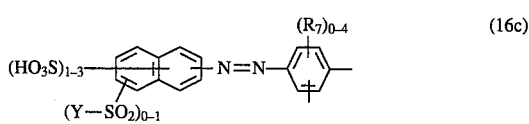

or

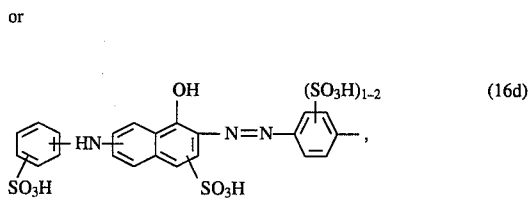

in which R$_7$ is halogen, nitro, cyano, trifluoromethyl, sulfamoyl, carbamoyl, C$_1$—C$_4$alkyl, C$_1$—C$_4$alkoxy, amino, acetylamino, ureido, hydroxyl, carboxyl, sulfomethyl or sulfo; and Y is β-sulfatoethyl, β-thiosulfatoethyl, β-phosphatoethyl, β-acyloxyethyl, β-haloethyl or vinyl.

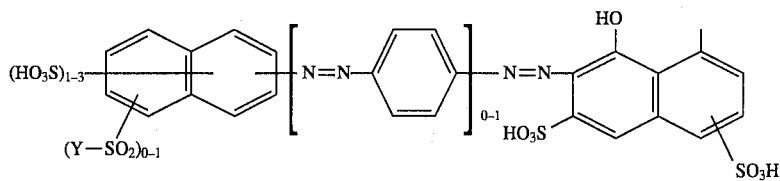     (17)

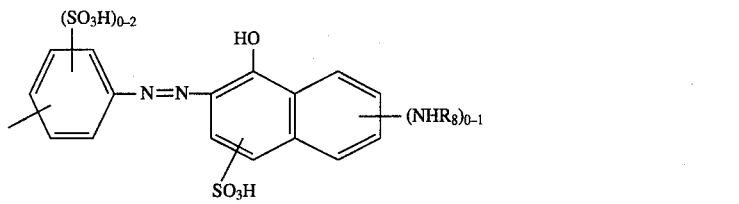     (18a)

or

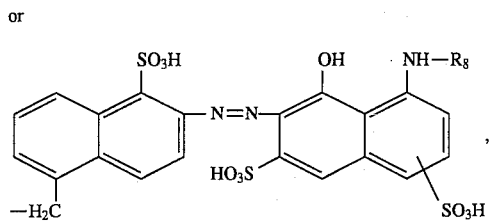     (18b)

in which $R_8$ is $C_1$—$C_4$alkanoyl or benzoyl; and Y is β-sulfatoethyl, β-thiosulfatoethyl, β-phosphatoethyl, β-acyloxyethyl, β-haloethyl or vinyl,

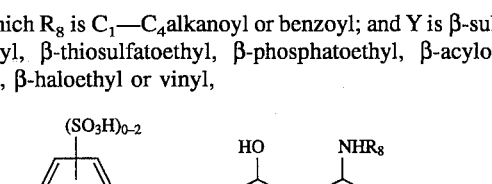     (19)

in which $R_8$ is $C_1$—$C_4$alkanoyl or benzoyl.

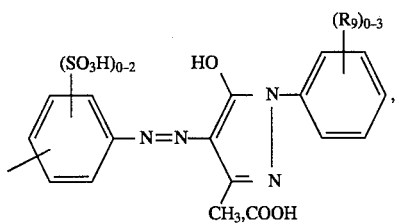     (20)

in which $R_9$ is $C_1$—$C_4$alkyl, $C_1$—$C_4$alkoxy, halogen, —$SO_2$—Y, carboxy or sulfo; and Y is β-sulfatoethyl, β-thiosulfatoethyl, β-phosphatoethyl, β-acyloxyethyl, β-haloethyl or vinyl.

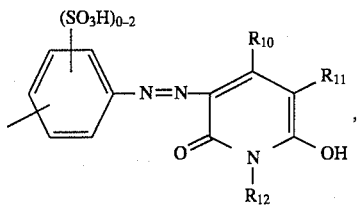     (21)

in which $R_{12}$ and $R_{10}$ independently of one another are hydrogen, $C_1$—$C_4$alkyl or phenyl, and $R_{11}$ is hydrogen, cyano, carbamoyl or sulfomethyl.

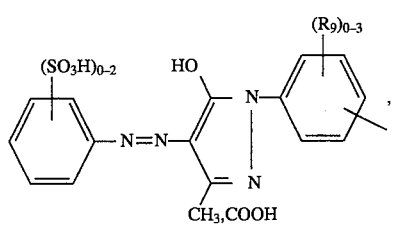     (22)

in which $R_9$ is $C_1$—$C_4$alkyl, $C_1$—$C_4$alkoxy, halogen, —$SO_2$—Y, carboxyl or sulfo; and Y is β-sulfatoethyl, β-thiosulfatoethyl, β-phosphatoethyl, β-acyloxyethyl, β-haloethyl or vinyl.

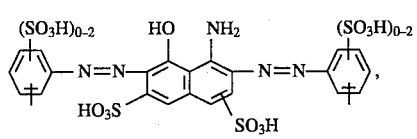     (22a)

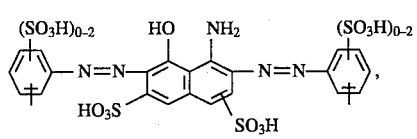     (23)

in which $R_{14}$ is $C_1$—$C_4$alkyl, $C_1$—$C_4$alkoxy, halogen, carboxyl or sulfo; and Y is β-sulfatoethyl, β-thiosulfatoethyl, β-phosphatoethyl, β-acyloxyethyl, β-haloethyl or vinyl.

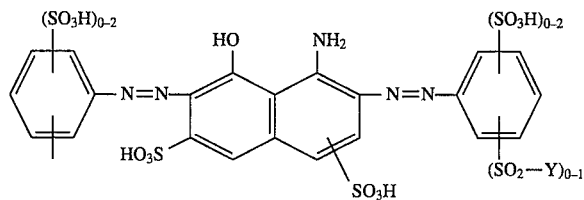
(23a)
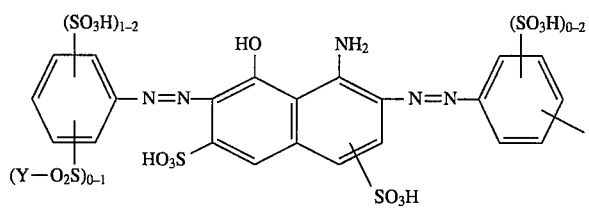
(23b)
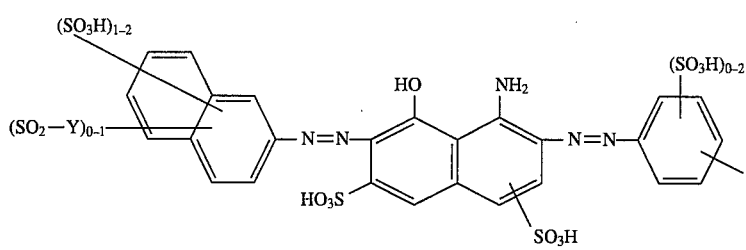
(23c)
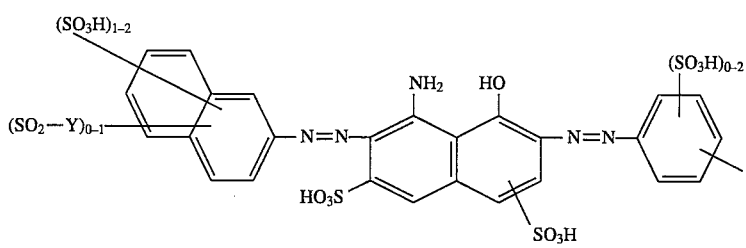
(23d)
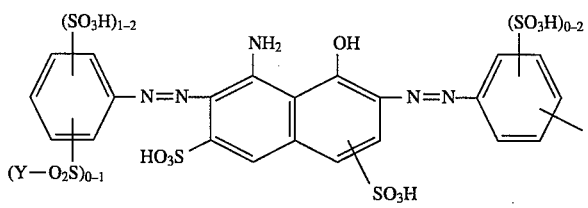
(23e)
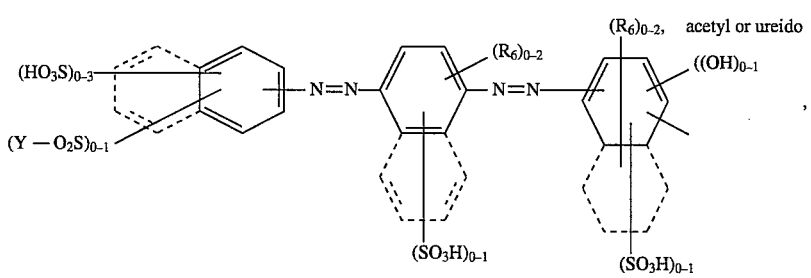
(23f)
in which $R_6$ and Y are as defined under formula (14).
Examples of particularly preferred chromophores on which the radical $D_1$ can be based are the following:

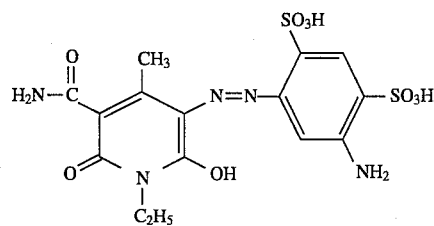
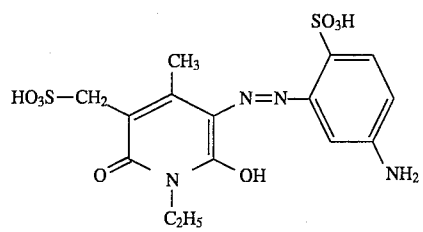
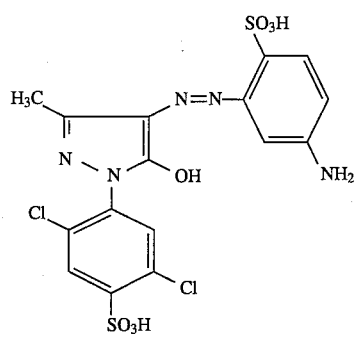
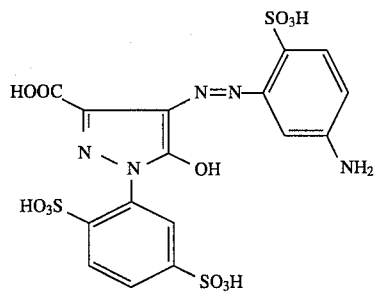
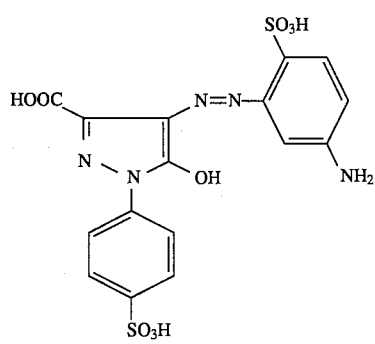
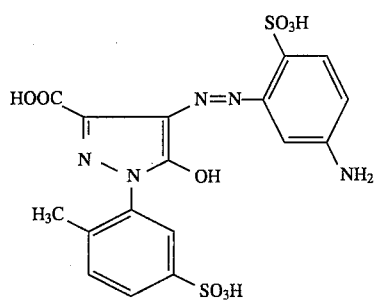

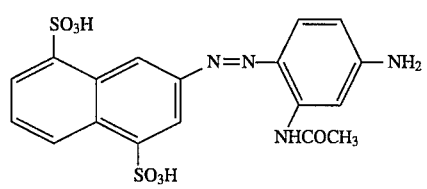
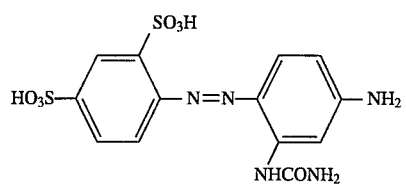
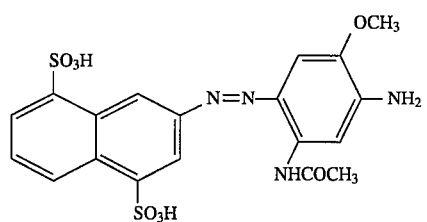
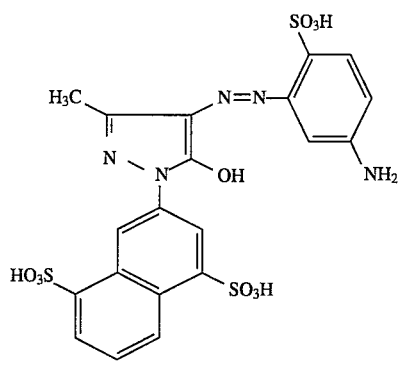
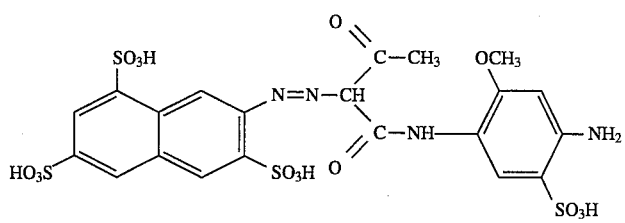
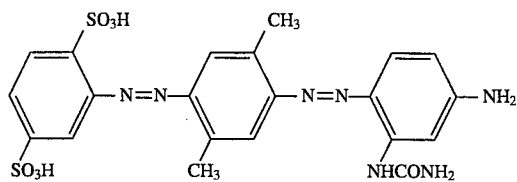
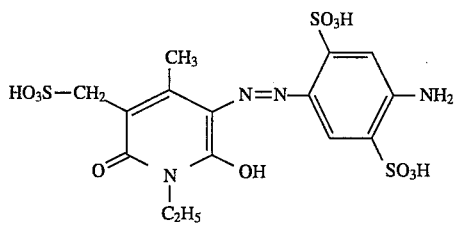

-continued
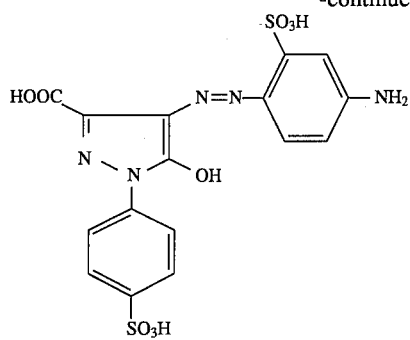
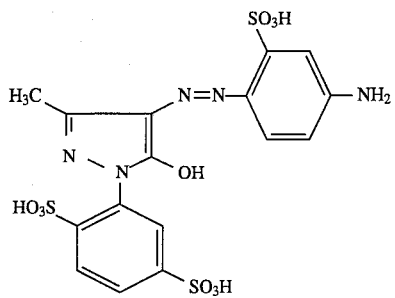
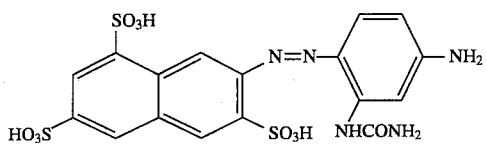
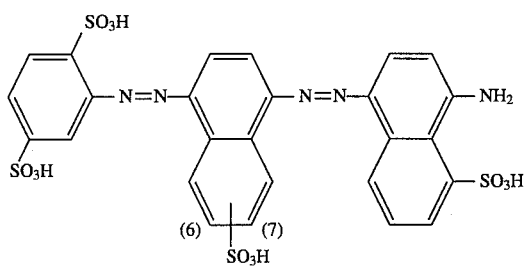
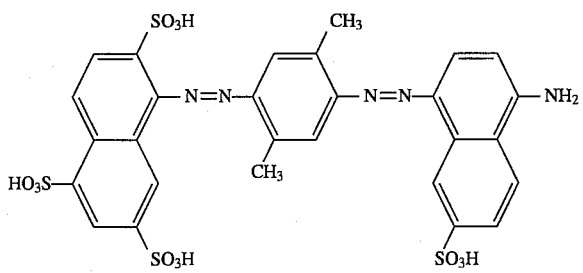
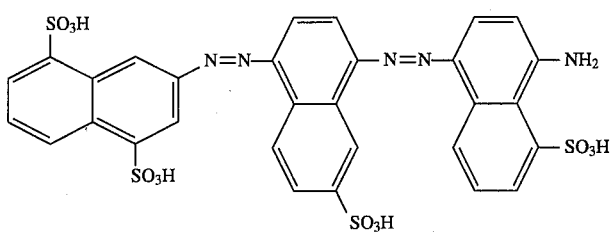

-continued
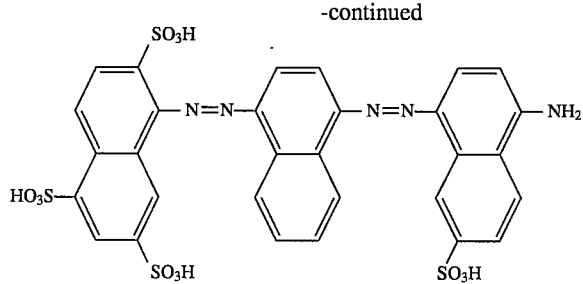
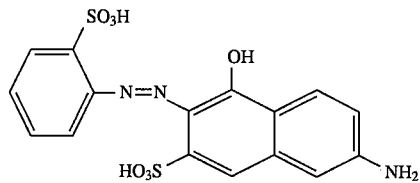
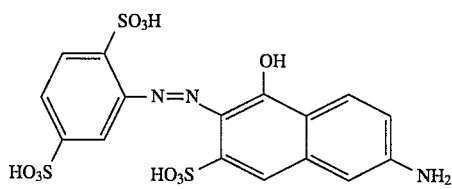
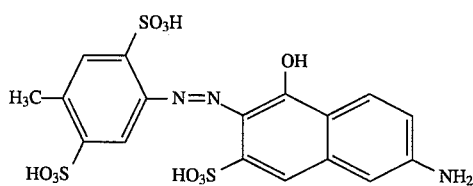
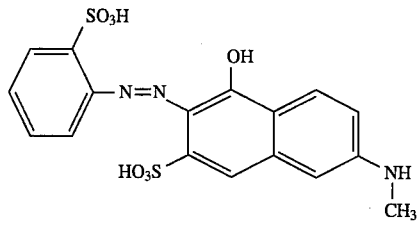
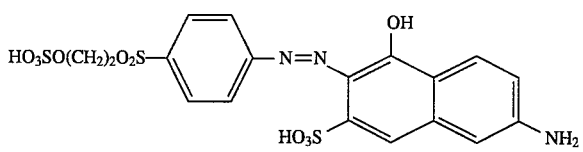
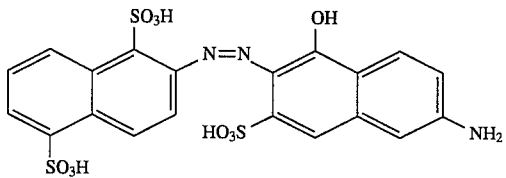
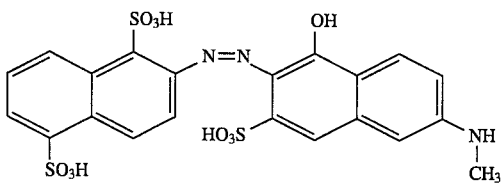

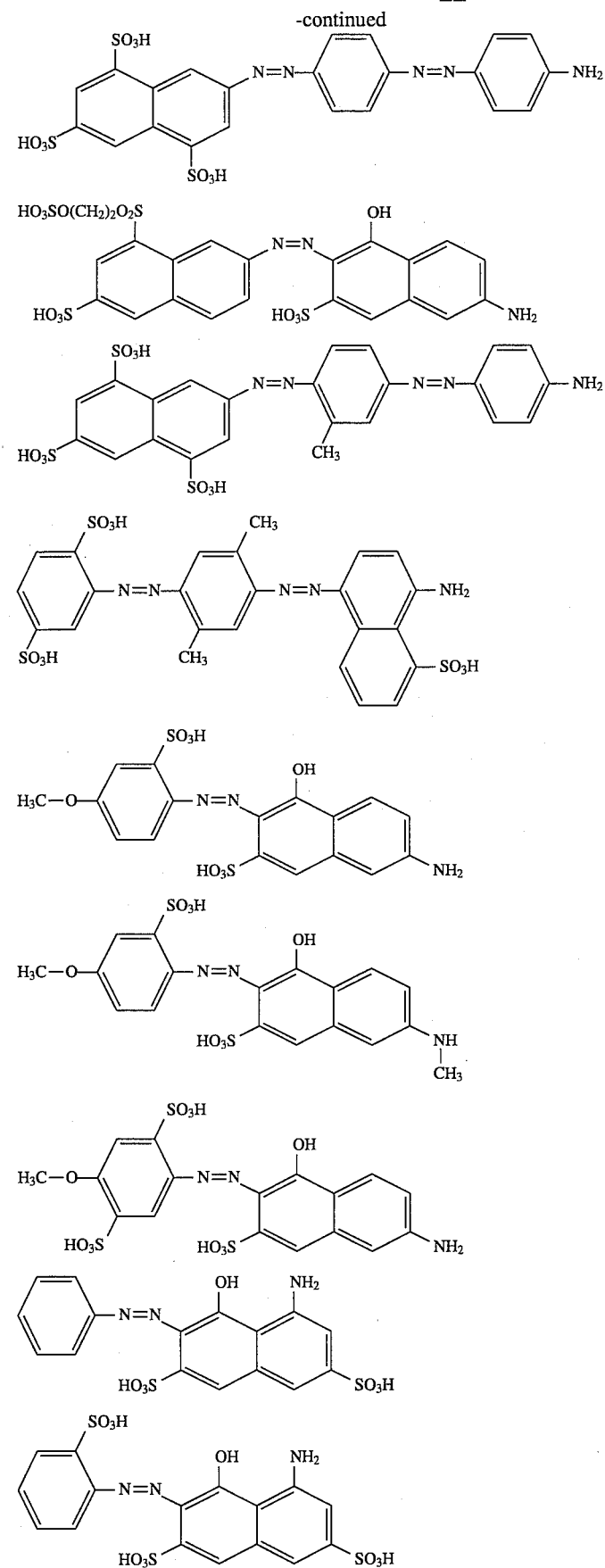

-continued
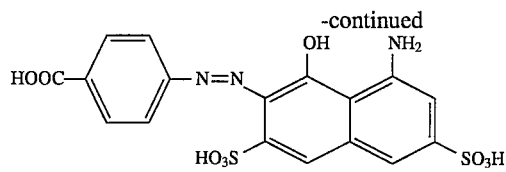
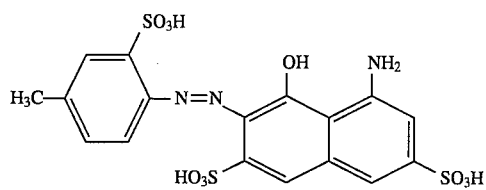
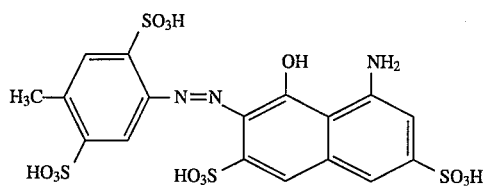
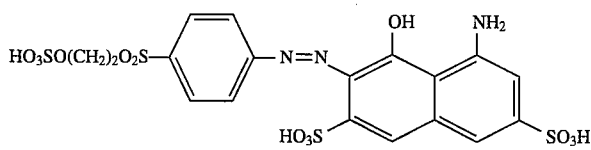
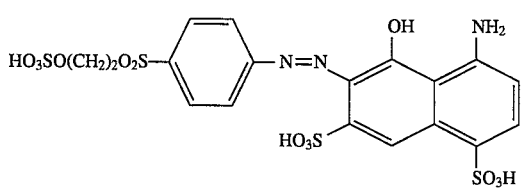
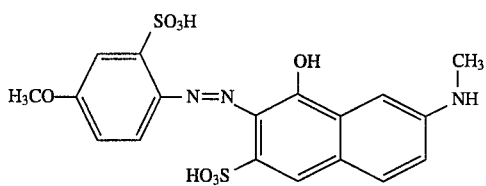
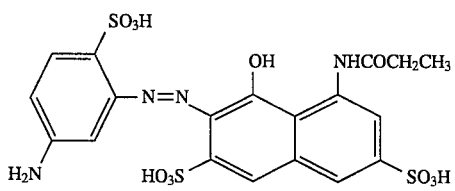
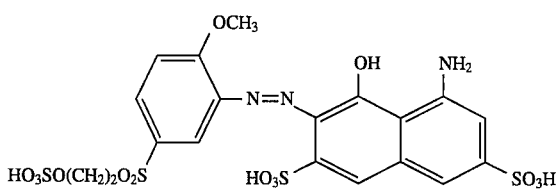
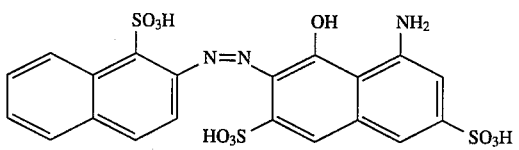

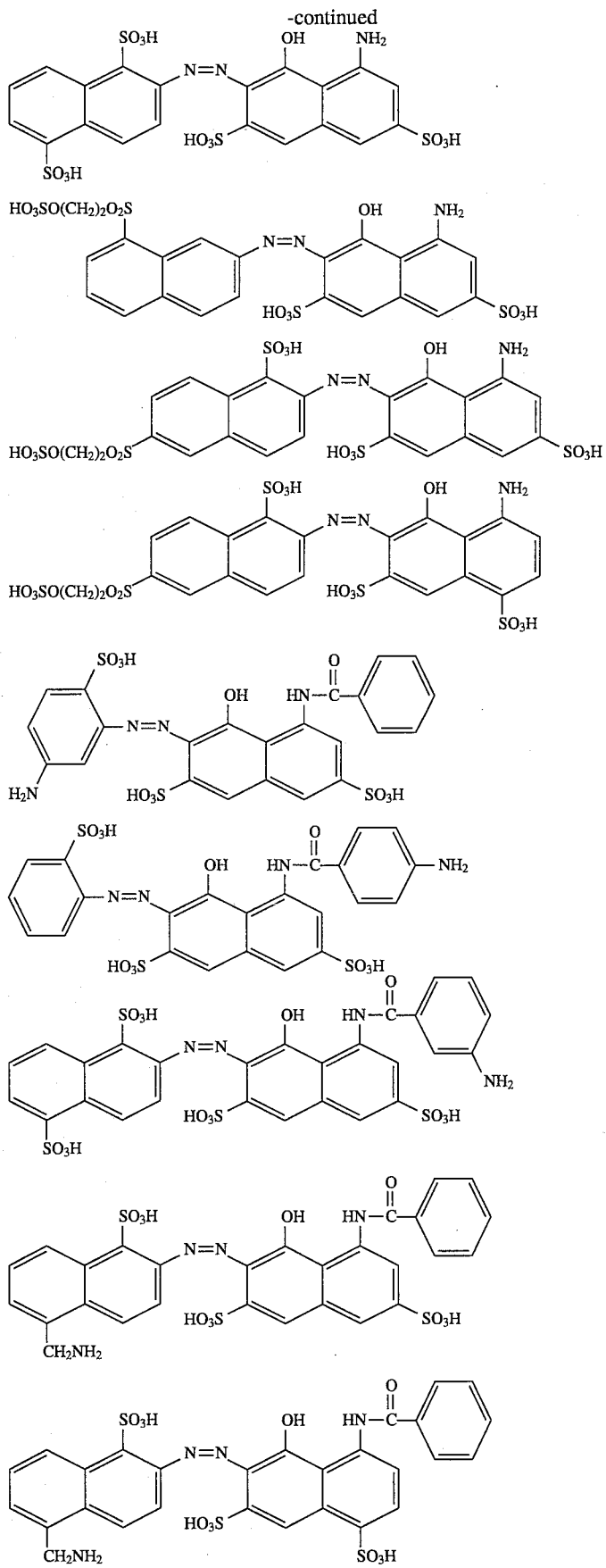

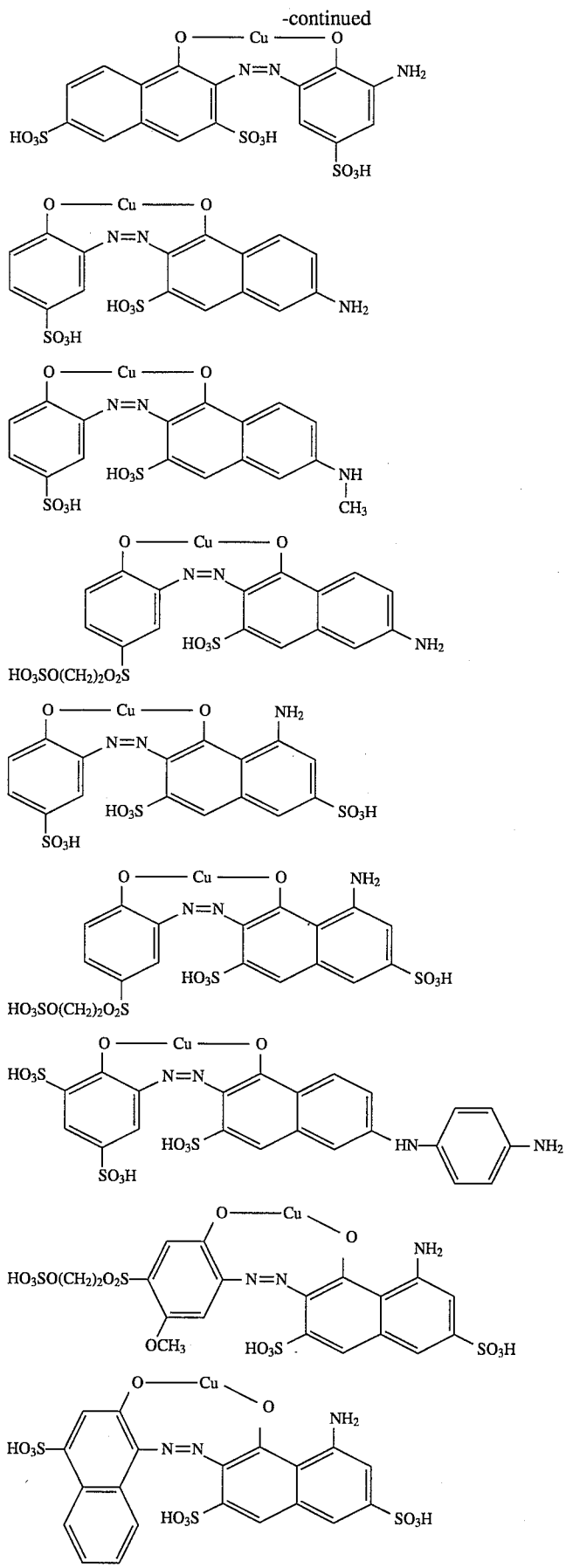

-continued
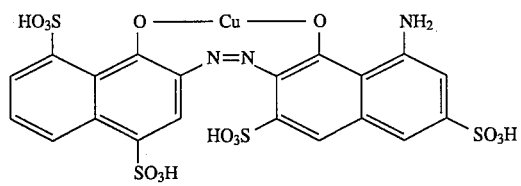
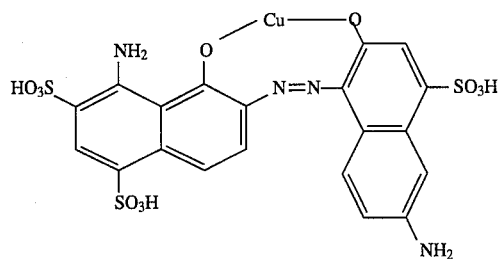
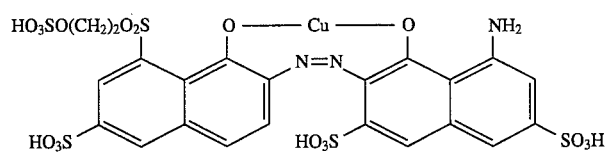
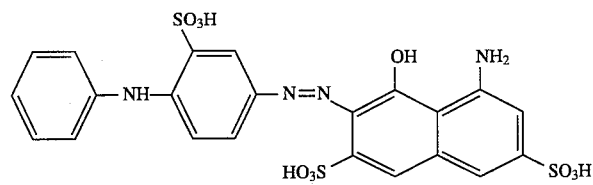
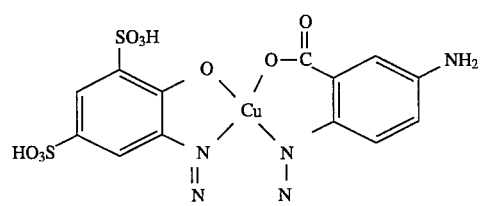
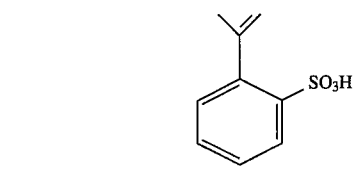
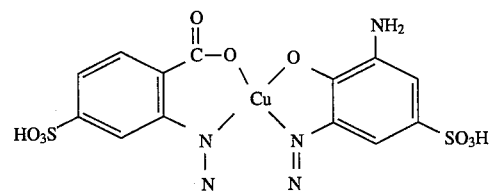
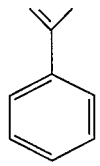

-continued
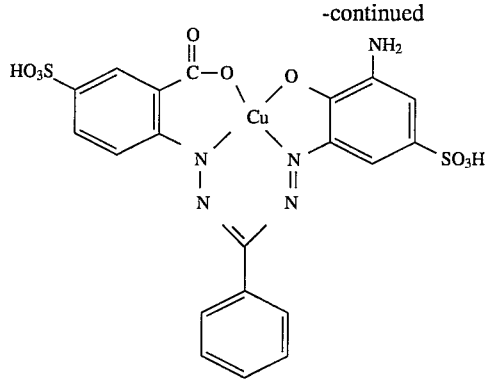
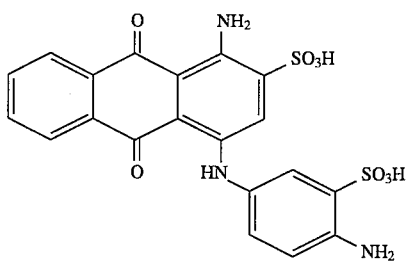
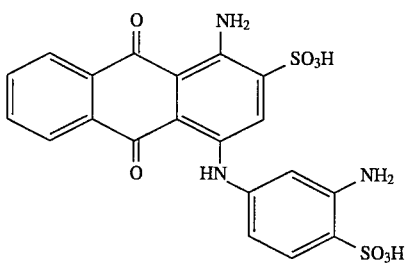
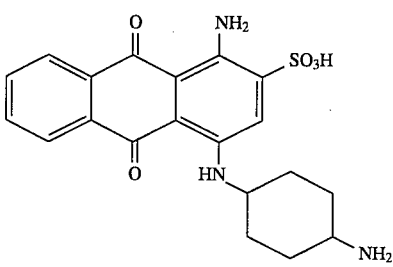
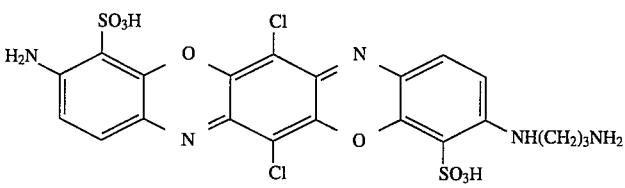
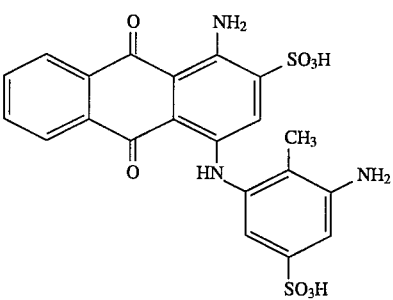

-continued
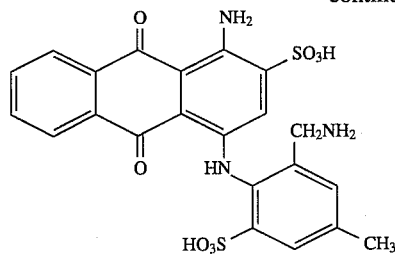
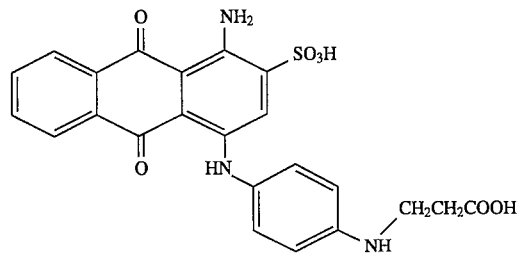
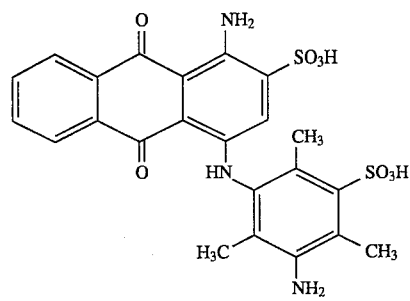
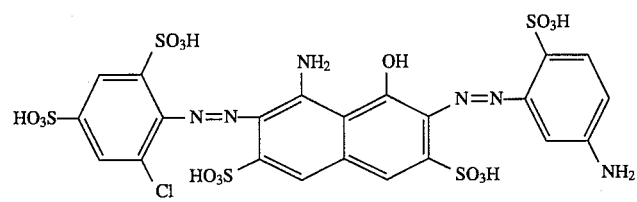
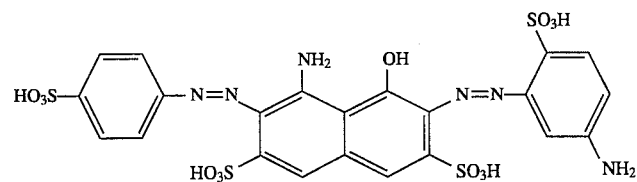
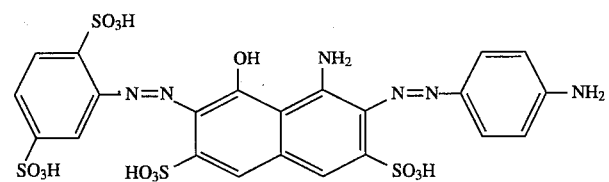
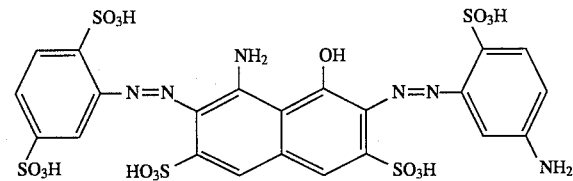

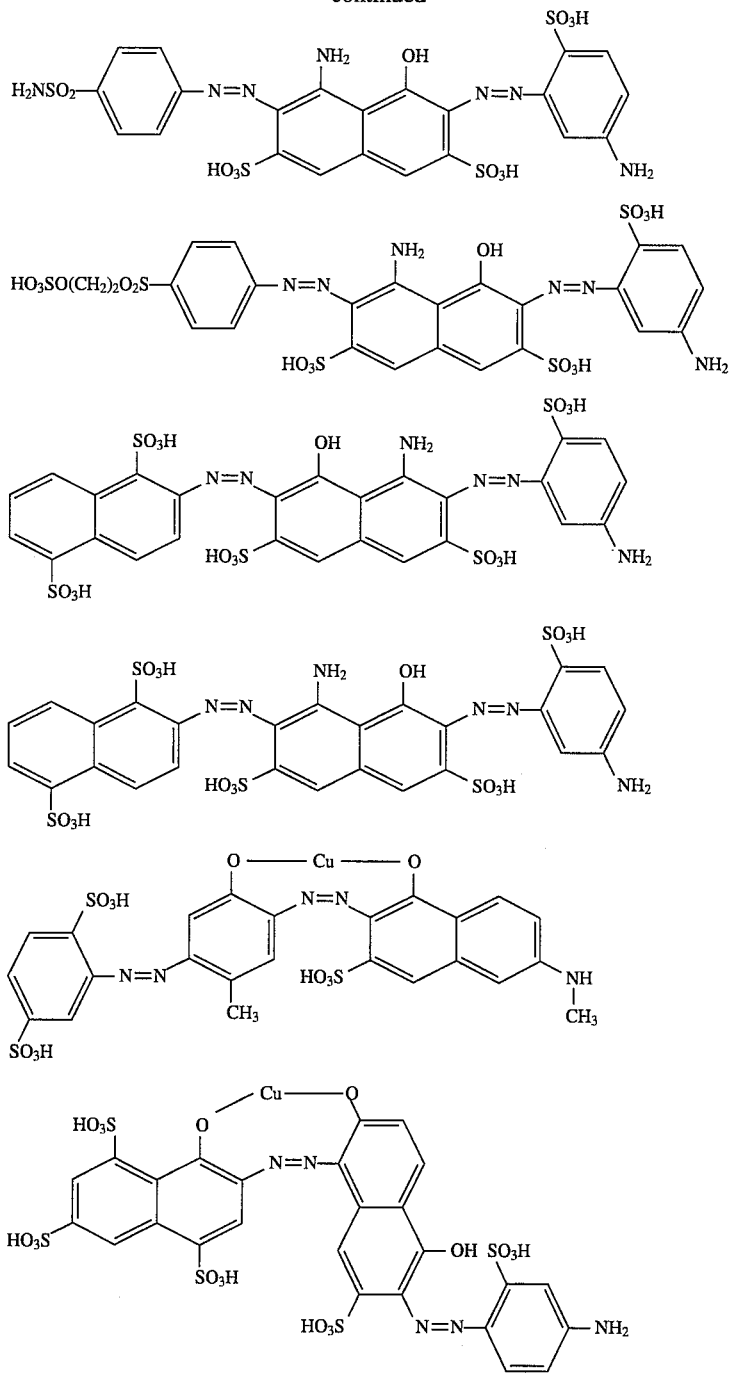

-continued
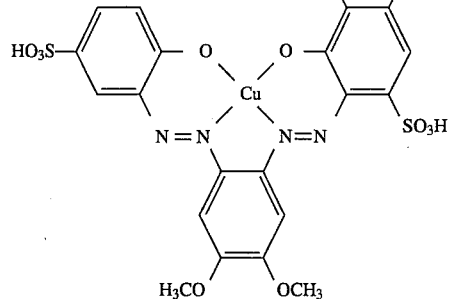
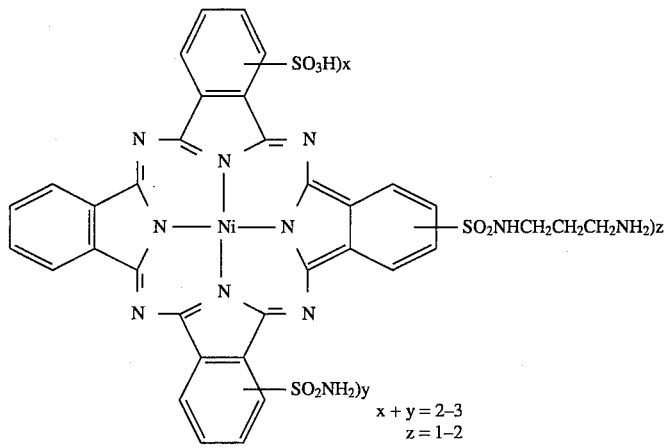
x + y = 2–3
z = 1–2
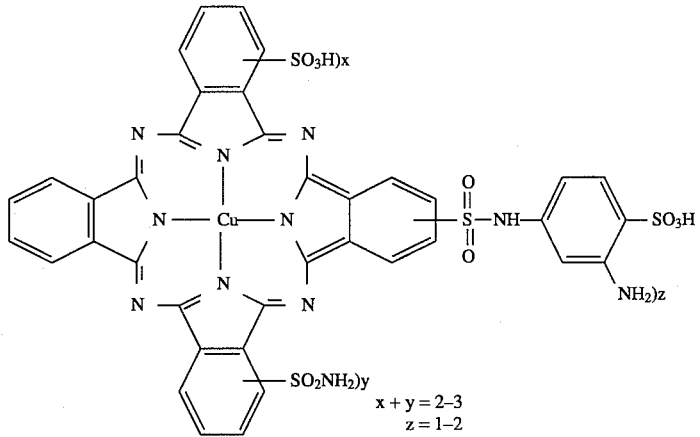
x + y = 2–3
z = 1–2

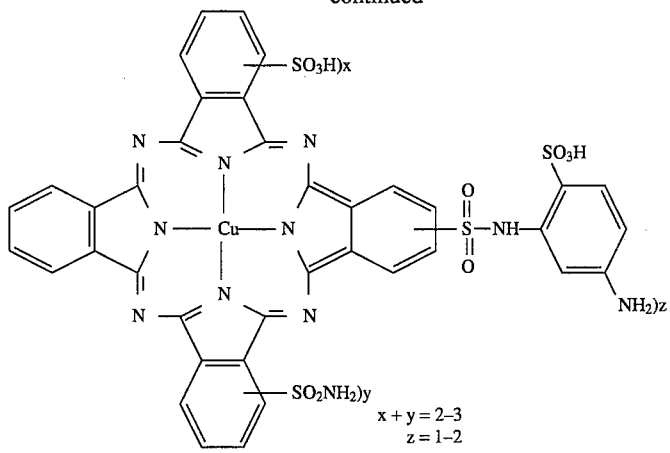

x + y = 2-3
z = 1-2

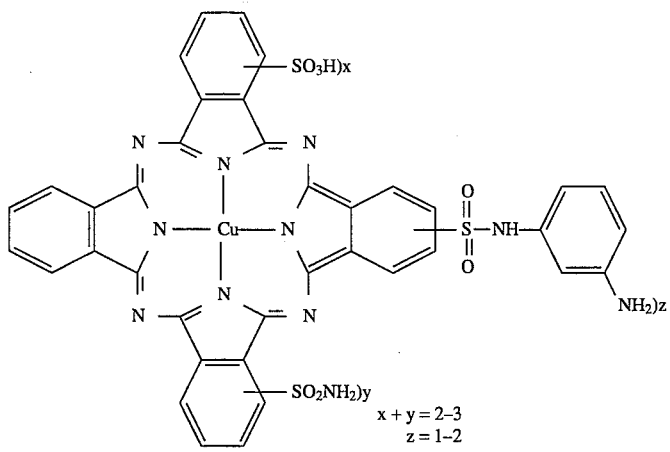

x + y = 2-3
z = 1-2

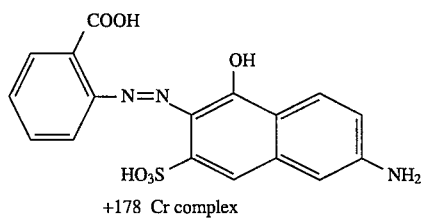

+178 Cr complex

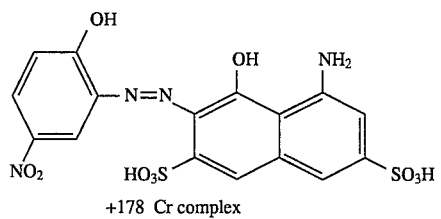

+178 Cr complex

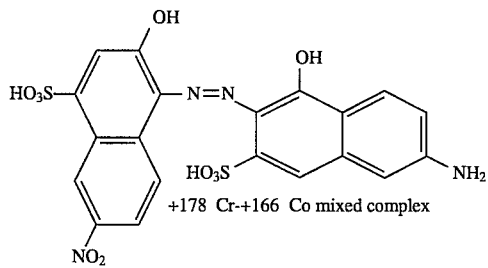

+178 Cr-+166 Co mixed complex

The compounds of the formula (1) contain at least one and preferably at least two sulfo groups which render them water-soluble, it being possible for these generally to be in the form of the free acid or, preferably, in salt form. Suitable salts are, for example, alkali metal, alkaline earth metal or ammonium salts or the salts of organic amines, for example sodium, potassium, lithium or ammonium salts or the salt of triethanolamine.

A preferred embodiment of the present invention relates to compounds of the formula

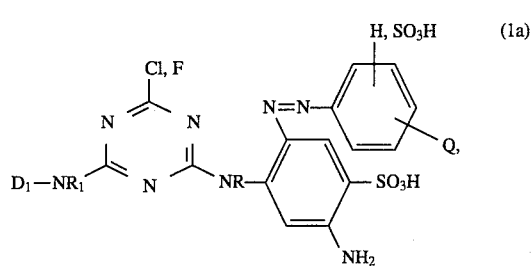

in which $D_1$ is the radical of a monoazo or disazo chromophore, R and $R_1$ independently of one another are each hydrogen, methyl or ethyl and Q is a radical of the formula $$—SO_2—Y \quad (5a) \text{ or}$$

$$—CONH—(CH_2)_{2-3}—SO_2—Y \quad (5b"),$$

in which Y is vinyl or β-sulfatoethyl.

A particularly preferred embodiment of the present invention relates to compounds of the formula (1 a) defined above, in which $D_1$ is a radical of the formula

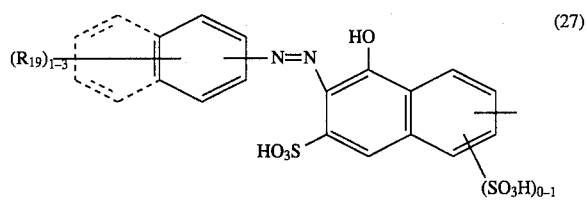

or

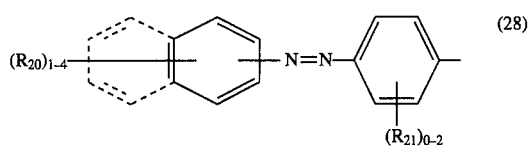

and in which $(R_{19})_{1-3}$ is 1 to 3 identical or different substituents $R_{19}$ from the group comprising sulfo, methoxy, methyl and the radical of the formula $—SO_2—Y$, in which Y is vinyl or β-sulfatoethyl, $(R_{20})_{1-4}$ is 1 to 4 identical or different substituents $R_{20}$ from the group comprising sulfo, hydroxyl, benzoylamino, acetylamino and propionylamino and $(R_{21})_{0-2}$ is 0 to 2 identical or different substituents from the group comprising methyl, methoxy, 2-hydroxyethoxy, 2-sulfatoethoxy, sulfo, acetylamino and ureido.

Another particularly preferred embodiment of the invention relates to compounds of the formula (1a) defined above, in which $D_1$ is a radical of the formula

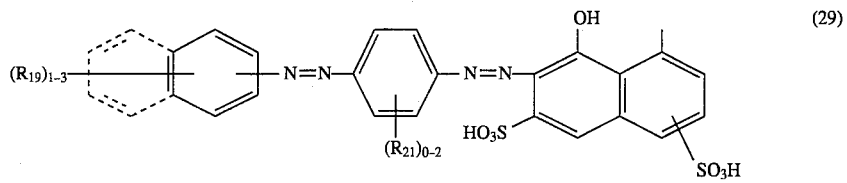

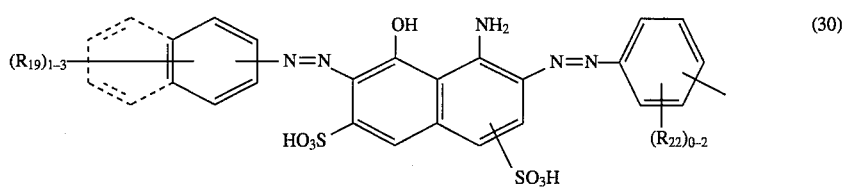

and in which $(R_{19})_{1-3}$ and $(R_{21})_{0-2}$ are as defined above and $(R_{22})_{0-2}$ is 0 to 2 identical or different substituents $R_{22}$ from the group comprising sulfo, chlorine, methyl and methoxy.

The reactive dyes of the formula (1) can be prepared in a manner known per se, for example by reacting approximately one molar equivalent of an organic dye of the formula $$D_1—NHR_1 \quad (24),$$

approximately one molar equivalent of the compound of the formula $$D—NHR \quad (25)$$

or suitable intermediates of the compounds of the formulae (24) or (25) and approximately one molar equivalent of a halotriazine, preferably 2,4,6-trichloro- or 2,4,6-trifluoro-s-triazine, with one another in any sequence, or, if intermediates of the compounds of the formulae (24) or (25) are used, convening the resulting intermediates into the desired dyes and if appropriate subsequently carrying out a further conversion reaction, for example for conversion of a halogen atom on the triazine into any radical X; in these formulae, D, $D_1$, R, $R_1$ and X in each case are as defined and as preferred above. The conversion of intermediates into the final dyes caused by the use of intermediates of the compounds of the formulae (24) or (25) is, in particular, a coupling reaction leading to azo dyes.

Since the individual process steps defined above can be carried out in various sequences, and if appropriate in some cases also simultaneously, various process variants are possible. In general, the reaction is carried out stepwise in succession, the sequence of the simple reactions known per se between the individual reaction components depending on the particular conditions.

A preferred variant for the preparation of the dyes according to the invention comprises reacting one molar equivalent of 2,4,6-trichloro- or 2,4,6-trifluoro-s-triazine first with one molar equivalent of the compound of the formula (24) defined above at an approximately neutral pH and a low temperature, for example 0°–5° C., and then with one molar equivalent of 2,4-diaminobenzenesulfonic acid at a slightly acid to neutral pH, for example pH 4.5–7.5, and a temperature of, for example, 0°–30° C., and coupling the resulting compound with one molar equivalent of a compound, diazotized in the customary manner, of the formula $$Z—NH_2 \quad (26),$$

in which Z is as defined above, at a neutral to slightly acid pH and a temperature of, for example, 0°–20° C.

The invention furthermore relates to a process for dyeing and printing cellulosic fibre materials with the dyes according to the invention. Examples of fibre materials are the naturally occurring cellulosic fibres, such as cotton, linen and hemp, as well as cellulose and regenerated cellulose. The dyes are also suitable for dyeing or printing fibres containing hydroxyl groups which are contained in blend fabrics, for example mixtures of cotton with polyamide fibres, or, in particular, polyester fibres.

The dyes according to the invention can be applied to the fibre material and fixed to the fibre in various ways, in particular in the form of aqueous dye solutions and printing pastes. They are suitable both for the exhaust method and for dyeing by the pad-dyeing method, in which the goods are impregnated with aqueous dye solutions, which contain salts if appropriate, and the dyes are fixed after an alkali treatment or in the presence of alkali, if appropriate under the action of heat. After the fixing, the dyeings or prints are rinsed thoroughly with cold and hot water, if appropriate with addition of a dispersing agent which promotes diffusion of the non-fixed portions. The customary dyeing or printing processes are used for dyeing and printing.

For the process according to the invention, the amounts in which the reactive dyes are used in the dyebaths or printing pastes can vary according to the desired depth of shade, and amounts of 0.01 to 10 per cent by weight, in particular 0.1 to 6 percent by weight, based on the dyed goods, have in general proved advantageous.

The dye liquors can comprise the generally customary additives, for example the aqueous solutions of inorganic salts, for example of alkali metal chlorides or alkali metal sulfates, alkali metal hydroxides, urea, thickeners, for example alginate thickeners, water-soluble cellulose alkyl ethers and dispersing assistants, levelling assistants and migration assistant inhibitors, and furthermore sodium m-nitrobenzenesulfonate and, as further thickeners, for example methylcellulose, starch ethers and emulsion thickeners, preferably an alginate, for example sodium alginate, and wetting agents.

Dyeing by the exhaust method is preferred for the process according to the invention. Dyeing here is as a rule carded out in an aqueous medium at a liquor ratio of, for example, 1:2 to 1:60, in particular a liquor ratio of 1:5 to 1:20, a pH of the dyebath of, for example, 6 to 13 and a temperature of, for example, 40° to 110° C., in particular a temperature of 60° to 95° C.

The dyes according to the invention are distinguished by a good fixing capacity and a very good build-up capacity. They are distinguished by a high degree of exhaustion and can be employed by the exhaust method over a very wide temperature range, and are therefore also suitable for dyeing cotton/polyester blend fabrics under the conditions recommended for such fabric. The dye mixtures according to the invention are also suitable for printing, in particular on cotton, or on blend fabrics which contain, for example, wool or silk.

The dyeings and prints produced with the dyes according to the invention on cellulosic fibre materials have a high depth of shape and a high fibre/dye bond stability both in the acid and in the alkaline range, and furthermore a good light-fastness and very good wet-fastness properties, such as fastnesses to washing, water, sea water, crossdyeing and perspiration, as well as a good fastness to pleating and fastness to ironing.

The following examples serve to illustrate the invention. The temperatures are stated in degrees Celsius, parts are by weight and percentages are by weight, unless stated otherwise. Parts by weight bear the same relation to parts by volume as the kilogram to the liter.

EXAMPLE 1

9.3 parts of cyanuric chloride are suspended in 100 parts of an ice/water mixture and the suspension is stirred. A solution of 27 parts of 7-(4-amino-2-ureido-phenylazo)naphthalene-1,3,6-trisulfonic acid in 200 parts of water is added dropwise to this suspension at 0°–5° C. and a pH of about 7, and the hydrochloric acid thereby formed is neutralized by addition of 2N sodium hydroxide solution (duration about 1 hour). A solution of 9.5 parts of 2,4-diaminobenzenesulfonic acid in 80 parts of water is then added dropwise to the reaction solution at 3°–5° C. and pH 5–5.5 and the solution is then stirred at 5°–30° C. and pH 5–7.5 for a further 2 to 3 hours. The pH is then adjusted to 4.5.

14.5 parts of 4-(2-sulfatoethylsulfonyl)aniline are diazotized in 130 parts of water in the customary manner and the diazonium salt solution is added dropwise to the solution of the coupling component in the course of about 1 hour. After about 2 hours at 2°–14° C. and pH 4.5–5.5, the reaction has ended. The resulting dye solution is desalinated and freeze-dried; the dye of the formula

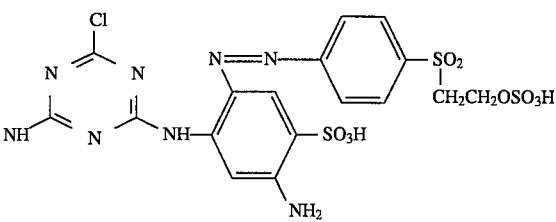

which dyes cellulosic fibres in golden yellow shades with good all-round fastness properties is obtained.

EXAMPLE 2

27 parts of 7-(4-amino-2-ureidophenylazo)naphthalene-1, 3,6-trisulfonic acid are dissolved in 400 parts of water under neutral conditions, and 8.5 parts of cyanuric fluoride are added dropwise at 0°–2° C. in the course of about 30 minutes. 10 parts of 2,4-diaminobenzenesulfonic acid in 80 parts of water are added dropwise to the reaction solution at 2°–20° C. and pH 5.5–6 (duration about 3 hours), and the resulting solution is then cooled to 0°–5° C.

14.5 parts of 4-(2-sulfatoethylsulfonyl)aniline are diazotized in 130 parts of water in the customary manner and the diazonium salt solution is added dropwise to the solution of the coupling component. Coupling takes place at 2°–15° C. and pH 5–7. When the reaction has ended, the pH is increased to 10 and the reaction solution is stirred at room temperature for about 20 minutes and neutralized. The resulting dye solution is desalinated and freeze-dried; the dye of the formula

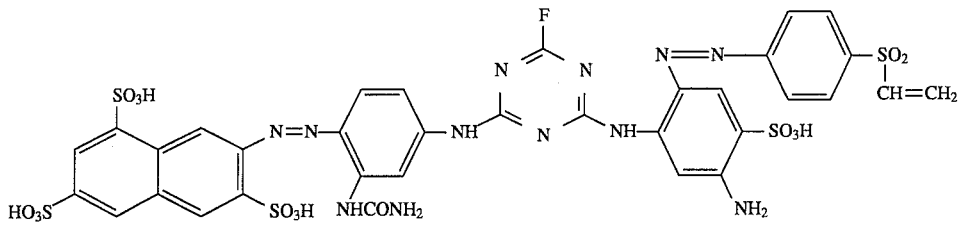

which dyes cellulosic fibres in strong yellow shades with good all-round fastness properties is obtained.

EXAMPLE 3

14.8 parts of cyanuric chloride are suspended in 150 parts of an ice/water mixture and the suspension is stirred. A solution of 42.2 parts of 8-amino-1-hydroxy-2-(1-sulfonaphth-2-yl-azo)naphthalene-3,6-disulfonic acid in 600 parts of water is added dropwise to this suspension at 0°–5° C. and a pH of about 7, and the hydrochloric acid thereby formed is neutralized by addition of 2N sodium hydroxide solution (duration about 3 hours). A solution of 15.9 parts of 2,4-diaminobenzenesulfonic acid in 120 parts of water is then added dropwise to the reaction solution, whereupon the pH falls to about 3.5. The reaction solution is then stirred at 5°–30° C. and pH 3.5–5 for about 2 to 3 hours and subsequently cooled to 0°–5° C.

22.5 parts of 4-(2-sulfatoethylsulfonyl)aniline are diazotized in 150 parts of water in the customary manner, the diazonium salt solution is added dropwise to the solution of the coupling component and coupling is carried out at 0°–25° C. and pH 4–6. The resulting dye solution is desalinated and freeze-dried; the dye of the formula

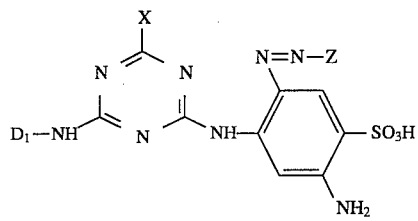

can be prepared as described in Examples 1 to 3 from the chromophores $D_1$-NHR and the diazo components Z-$NH_2$ shown in Table 1; the variables $B_1$ to $B_{11}$ here are defined after Example 88f.

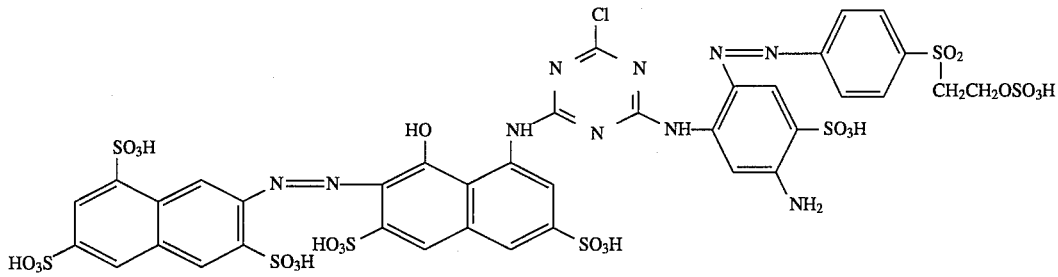

which dyes cellulosic fibres in yellowish-tinged red shades with good all-round fastness properties is obtained.

EXAMPLES 4 TO 88f

Further dyes of the general formula

TABLE 1

| Example No. | $D_1-NH_2$ | X | $Z-NH_2$ |
|---|---|---|---|
| 4 | naphthalene with SO₃H (×3) azo-linked to phenyl with NH₂ and NHCONH₂ | Cl | $B_1$ |
| 5 | naphthalene with SO₃H (×3) azo-linked to phenyl with NH₂ and NHCONH₂ | N-methylmorpholine | $B_1$ |
| 6 | pyridone (H₂N-CO, CH₃, N-C₂H₅, OH) azo-linked to phenyl with SO₃H and NH₂ | Cl | $B_2$ |
| 7 | pyridone (H₂N-CO, CH₃, N-C₂H₅, OH) azo-linked to phenyl with 2×SO₃H and NH₂ | Cl | $B_1$ |
| 8 | pyridone (HO₃S-CH₂, CH₃, N-C₂H₅, OH) azo-linked to phenyl with SO₃H and NH₂ | F | $B_1$ |
| 9 | pyrazole (HOOC, OH, N-phenyl-SO₃H) azo-linked to phenyl with SO₃H and NH₂ | F | $B_3$ |
| 10 | naphthalene with 2×SO₃H azo-linked to phenyl with NH₂ and NHCOCH₃ | Cl | $B_1$ |

TABLE 1-continued

| Example No. | D₁—NH₂ | X | Z—NH₂ |
|---|---|---|---|
| 11 | 2,4-disulfophenyl-N=N-(2-ureido-4-amino)phenyl | F | B₄ |
| 12 | 5,8-disulfonaphth-2-yl-N=N-(2-acetamido-5-methoxy-4-amino)phenyl | Cl | B₁ |
| 13 | 6-sulfo-8-sulfonaphth-2-yl-N=N-(2-acetamido-4-amino)phenyl | Cl | B₁ |
| 14 | 2-sulfophenyl-N=N-(1-hydroxy-3-sulfo-6-amino)naphth-2-yl | Cl | B₁ |
| 15 | 2,5-disulfophenyl-N=N-(1-hydroxy-3-sulfo-6-amino)naphth-2-yl | Cl | B₃ |
| 16 | 5-methyl-2,4-disulfophenyl-N=N-(1-hydroxy-3-sulfo-6-amino)naphth-2-yl | F | B₁ |
| 17 | 2-sulfophenyl-N=N-(1-hydroxy-3-sulfo-6-methylamino)naphth-2-yl | Cl | B₅ |
| 18 | 4-(2-sulfatoethylsulfonyl)phenyl-N=N-(1-hydroxy-3-sulfo-6-amino)naphth-2-yl | N-methylmorpholine | B₆ |

TABLE 1-continued

| Example No. | D₁—NH₂ | X | Z—NH₂ |
|---|---|---|---|
| 19 | (naphthalene with SO₃H at 1-position, SO₃H at 5-position, azo linked to 1-hydroxy-3-sulfo-6-amino-naphthalene) | F | B₁ |
| 20 | (naphthalene with SO₃H at 1-position, SO₃H at 5-position, azo linked to 1-hydroxy-3-sulfo-6-(methylamino)-naphthalene) | Cl | B₁ |
| 21 | (1,5,7-trisulfonaphthalene azo linked to phenyl-azo-4-aminophenyl) | Cl | B₁ |
| 22 | (1,5,7-trisulfonaphthalene azo linked to 2-methylphenyl-azo-4-aminophenyl) | Cl | B₇ |
| 23 | (2-sulfophenyl azo linked to 1-hydroxy-3-sulfo-7-sulfo-8-amino-naphthalene) | F | B₁ |
| 24 | (4-methoxy-2-sulfophenyl azo linked to 1-hydroxy-3-sulfo-6-(methylamino)-naphthalene) | Cl | B₂ |
| 25 | (4-methoxy-2,5-disulfophenyl azo linked to 1-hydroxy-3-sulfo-6-amino-naphthalene) | F | B₁ |
| 26 | (phenyl azo linked to 1-hydroxy-3,6-disulfo-8-amino-naphthalene) | Cl | B₁ |

TABLE 1-continued

| Example No. | $D_1-NH_2$ | X | $Z-NH_2$ |
|---|---|---|---|
| 27 | 2-sulfophenyl-azo-1-hydroxy-8-amino-3,6-disulfonaphthalene | F | $B_1$ |
| 28 | 4-carboxyphenyl-azo-1-hydroxy-8-amino-3,6-disulfonaphthalene | Cl | $B_4$ |
| 29 | 4-methyl-2-sulfophenyl-azo-1-hydroxy-8-amino-3,6-disulfonaphthalene | 3-aminobenzenesulfonic acid | $B_1$ |
| 30 | 4-methyl-2,5-disulfophenyl-azo-1-hydroxy-8-amino-3,6-disulfonaphthalene | Cl | $B_1$ |
| 31 | 4-(β-sulfatoethylsulfonyl)phenyl-azo-1-hydroxy-8-amino-3,6-disulfonaphthalene | Cl | $B_6$ |
| 32 | 4-(β-sulfatoethylsulfonyl)phenyl-azo-1-hydroxy-8-amino-3,5-disulfonaphthalene | Cl | $B_8$ |
| 33 | 4-amino-2-sulfophenyl-azo-1-hydroxy-8-propionylamino-3,6-disulfonaphthalene | Cl | $B_1$ |
| 34 | 1-sulfonaphth-2-yl-azo-1-hydroxy-8-amino-3,6-disulfonaphthalene | Cl | $B_5$ |
| 35 | 1,5-disulfonaphth-2-yl-azo-1-hydroxy-8-amino-3,6-disulfonaphthalene | F | $B_1$ |

TABLE 1-continued

| Example No. | $D_1-NH_2$ | X | $Z-NH_2$ |
|---|---|---|---|
| 36 | [structure: HO₃SO(CH₂)₂O₂S-naphthyl-N=N-naphthyl(OH)(NH₂)(SO₃H)₂, with HO₃S on middle ring] | [structure: aniline with NH₂ and SO₃H (meta)] | $B_1$ |
| 37 | [structure: HO₃SO(CH₂)₂O₂S-naphthyl(SO₃H)-N=N-naphthyl(OH)(NH₂)(SO₃H)₂] | F | $B_2$ |
| 38 | [structure: HO₃SO(CH₂)₂O₂S-naphthyl(SO₃H)-N=N-naphthyl(OH)(NH₂)(SO₃H)₂ with additional SO₃H] | Cl | $B_8$ |
| 39 | [structure: H₂N-phenyl(SO₃H)-N=N-naphthyl(OH)(SO₃H)₂-NHC(O)-phenyl] | Cl | $B_3$ |
| 40 | [structure: phenyl(SO₃H)-N=N-naphthyl(OH)(SO₃H)₂-NHC(O)-phenyl-NH₂] | [structure: aniline with NH₂ and SO₃H (meta)] | $B_1$ |
| 41 | [structure: Cu complex of formazan dye with sulfonic acid groups and NH₂] | F | $B_1$ |

TABLE 1-continued

| Example No. | D₁—NH₂ | X | Z—NH₂ |
|---|---|---|---|
| 42 | (structure) | F | B₁ |
| 43 | (structure) | Cl | B₅ |
| 44 | (structure) | Cl | B₁ |
| 45 | (structure) | HN(CH₂CH₂OH)₂ | B₁ |
| 46 | (structure) | Cl | B₁ |

TABLE 1-continued

| Example No. | $D_1-NH_2$ | X | $Z-NH_2$ |
|---|---|---|---|
| 47 | 1-amino-4-[(4-amino-2,6-dimethyl-3-sulfo)phenylamino]anthraquinone-2-sulfonic acid derivative | F | $B_1$ |
| 48 | 8-amino-7-[(4-sulfophenyl)azo]-1-hydroxy-6-sulfo-2-[(2-sulfo-5-aminophenyl)azo]naphthalene-3-sulfonic acid | F | $B_1$ |
| 49 | 8-amino-7-[(2,5-disulfophenyl)azo]-1-hydroxy-6-sulfo-2-[(2-sulfo-5-aminophenyl)azo]naphthalene-3-sulfonic acid | Cl | $B_1$ |
| 50 | 8-amino-7-[(4-aminosulfonylphenyl)azo]-1-hydroxy-6-sulfo-2-[(2-sulfo-5-aminophenyl)azo]naphthalene-3-sulfonic acid | Cl | $B_5$ |
| 51 | 8-amino-7-[(4-(2-sulfatoethylsulfonyl)phenyl)azo]-1-hydroxy-6-sulfo-2-[(2-sulfo-5-aminophenyl)azo]naphthalene-3-sulfonic acid | Cl | $B_6$ |
| 52 | 8-amino-7-[(1,5-disulfonaphth-2-yl)azo]-1-hydroxy-6-sulfo-2-[(2-sulfo-5-aminophenyl)azo]naphthalene-3-sulfonic acid | Cl | $B_1$ |
| 53 | 8-amino-7-[(1,5-disulfonaphth-2-yl)azo]-1-hydroxy-6-sulfo-2-[(2-sulfo-5-aminophenyl)azo]naphthalene-3-sulfonic acid | F | $B_1$ |

TABLE 1-continued
| Example No. | $D_1-NH_2$ | X | $Z-NH_2$ |
|---|---|---|---|
| 54 | 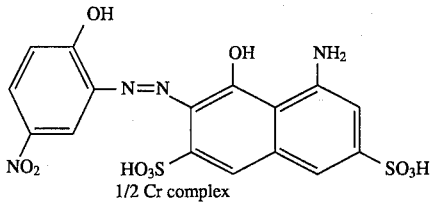 1/2 Cr complex | Cl | $B_1$ |
| 55 | 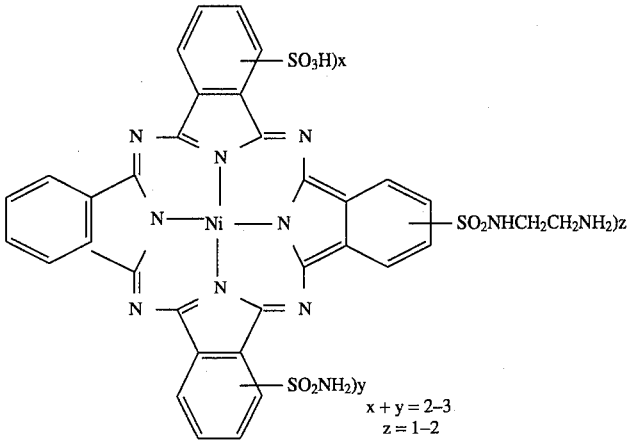 x + y = 2-3, z = 1-2 | F | $B_1$ |
| 56 | 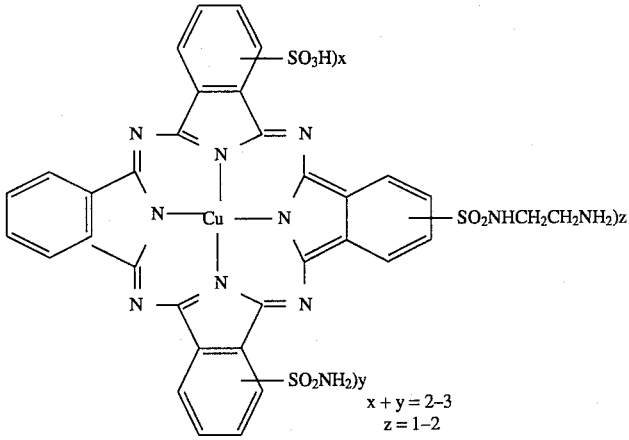 x + y = 2-3, z = 1-2 | Cl | $B_1$ |
| 57 | 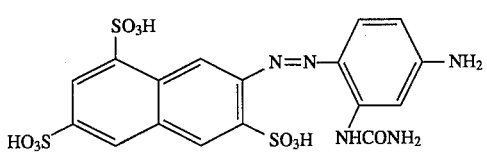 |  | 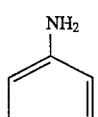 $B_1$ |
| 58 | 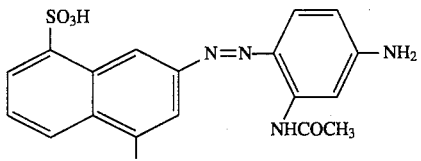 |  | 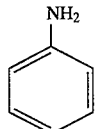 $B_1$ |

TABLE 1-continued

| Example No. | $D_1-NH_2$ | X | $Z-NH_2$ |
|---|---|---|---|
| 59 | 4-($\beta$-sulfatoethylsulfonyl)phenyl–N=N–(1-hydroxy-6-amino-3-sulfo-2-naphthyl) | 4-($\beta$-sulfatoethylsulfonyl)aniline | $B_1$ |
| 60 | 2-sulfophenyl–N=N–(1-hydroxy-6-amino-3-sulfo-2-naphthyl) | 4-($\beta$-sulfatoethylsulfonyl)aniline | $B_1$ |
| 61 | 4-methyl-2,5-disulfophenyl–N=N–(1-hydroxy-6-amino-3-sulfo-2-naphthyl) | 4-($\beta$-sulfatoethylsulfonyl)aniline | $B_1$ |
| 62 | 2-sulfophenyl–N=N–(1-hydroxy-6-methylamino-3-sulfo-2-naphthyl) | 4-($\beta$-sulfatoethylsulfonyl)aniline | $B_1$ |
| 63 | 4-methoxy-2-sulfophenyl–N=N–(1-hydroxy-6-amino-3-sulfo-2-naphthyl) | 4-($\beta$-sulfatoethylsulfonyl)aniline | $B_1$ |
| 64 | 4-($\beta$-sulfatoethylsulfonyl)phenyl–N=N–(1-hydroxy-8-amino-3,6-disulfo-2-naphthyl) | 4-($\beta$-sulfatoethylsulfonyl)aniline | $B_1$ |
| 65 | 4-($\beta$-sulfatoethylsulfonyl)phenyl–N=N–(1-hydroxy-8-amino-3,6-disulfo-2-naphthyl) | 4-($\beta$-sulfatoethylsulfonyl)aniline | $B_6$ |
| 66 | 2-sulfophenyl–N=N–(1-hydroxy-8-amino-3,6-disulfo-2-naphthyl) | 4-($\beta$-sulfatoethylsulfonyl)aniline | $B_1$ |

TABLE 1-continued

| Example No. | $D_1-NH_2$ | X | $Z-NH_2$ |
|---|---|---|---|
| 67 | 1-sulfo-5-sulfonaphth-2-yl azo coupled to 1-hydroxy-8-amino-3,6-disulfonaphth-2-yl (with HO$_3$S at 3-position) | 4-(SO$_2$(CH$_2$)$_2$OSO$_3$H)aniline (NH$_2$) | B$_1$ |
| 68 | 2-sulfo-4-amino-phenyl azo coupled to 1-hydroxy-8-(NHCOCH$_2$CH$_3$)-3,6-disulfonaphth-2-yl | 4-(SO$_2$(CH$_2$)$_2$OSO$_3$H)aniline (NH$_2$) | B$_1$ |
| 69 | 2-sulfo-5-sulfophenyl azo coupled to 1-hydroxy-8-amino-3,6-disulfonaphth-2-yl | Cl | B$_1$ |
| 70 | 2-sulfo-5-sulfophenyl azo coupled to 1-hydroxy-8-amino-3,6-disulfonaphth-2-yl | F | B$_1$ |
| 71 | 2-sulfo-4-sulfophenyl azo coupled to 1-hydroxy-8-amino-3,6-disulfonaphth-2-yl | Cl | B$_1$ |
| 72 | 2-sulfo-4-sulfophenyl azo coupled to 1-hydroxy-8-amino-3,6-disulfonaphth-2-yl | F | B$_1$ |
| 73 | 4-(HO$_3$SO(CH$_2$)$_2$O$_2$S)phenyl azo coupled to 1-hydroxy-8-amino-3,6-disulfonaphth-2-yl | Cl | B$_1$ |
| 74 | 1-sulfonaphth-2-yl azo coupled to 1-hydroxy-8-amino-3,6-disulfonaphth-2-yl | Cl | B$_1$ |

TABLE 1-continued

| Example No. | D₁—NH₂ | X | Z—NH₂ |
|---|---|---|---|
| 75 | (naphthalene with SO₃H, SO₃H, N=N, OH, NH₂, HO₃S, SO₃H) | Cl | B₁ |
| 76 | (Cu complex structure with COO, HO₃S, N=N, NH₂, SO₃H, phenyl) | Cl | B₁ |
| 77 | (H₃C-phenyl with SO₃H, N=N, OH, NH₂, HO₃S, SO₃H) | H₂N-phenyl-SO₂(CH₂)₂OSO₃H | B₁ |
| 78 | (naphthalene-SO₃H, SO₃H, N=N, OCH₃, NHCOCH₃, N=N, OH, NH₂, HO₃S, SO₃H) | Cl | B₁ |
| 79 | (phenyl-SO₃H, N=N, OCH₃, NHCOCH₃, N=N, OH, NH₂, HO₃S, SO₃H) | Cl | B₁ |
| 80 | (HO₃SO(H₂C)₂O₂S-phenyl-N=N-phenyl with SO₃H, NH₂, H₂N) | Cl | B₁ |
| 81 | (HO₃SO(H₂C)₂O₂S-phenyl-N=N-phenyl with SO₃H, NH₂, H₂N) | OH | B₁ |

TABLE 1-continued

| Example No. | $D_1-NH_2$ | X | $Z-NH_2$ |
|---|---|---|---|
| 82 | 2,5-disulfophenyl-azo-(1-hydroxy-8-amino-3,6-disulfo)naphthalene | F | $B_9$ |
| 83 | 2,4-disulfophenyl-azo-(1-hydroxy-8-amino-3,6-disulfo)naphthalene | Cl | $B_9$ |
| 84 | 2,4-disulfophenyl-azo-(1-hydroxy-8-amino-3,6-disulfo)naphthalene | F | $B_{10}$ |
| 85 | 4-(β-sulfatoethylsulfonyl)phenyl-azo-(1-hydroxy-8-amino-3,6-disulfo)naphthalene | Cl | $B_{10}$ |
| 86 | 1-sulfo-2-naphthyl-azo-(1-hydroxy-8-amino-3,6-disulfo)naphthalene | Cl | $B_{11}$ |
| 87 | 1,5-disulfo-2-naphthyl-azo-(1-hydroxy-8-amino-3,6-disulfo)naphthalene | F | $B_1$ |
| 88 | Cu-complex formazan structure | Cl | $B_9$ |

TABLE 1-continued

| Example No. | $D_1-NH_2$ | X | $Z-NH_2$ |
|---|---|---|---|
| 88a | [Structure: 2,5-disulfophenyl–N=N–(2-(2-hydroxyethoxy)-5-methylphenyl)–N=N–(1-hydroxy-8-amino-3,6-disulfo-naphthalen-2-yl)] | Cl | $B_1$ |
| 88b | [Structure: 2,5-disulfophenyl–N=N–(2-(2-hydroxyethoxy)-5-methylphenyl)–N=N–(1-hydroxy-8-amino-3,6-disulfo-naphthalen-2-yl)] | F | $B_1$ |
| 88c | [Structure: 2,5-disulfophenyl–N=N–(2-(2-sulfatoethoxy)-5-methylphenyl)–N=N–(1-hydroxy-8-amino-3,6-disulfo-naphthalen-2-yl)] | Cl | $B_1$ |
| 88d | [Structure: 2,5-disulfophenyl–N=N–(2-(2-sulfatoethoxy)-5-acetamidophenyl)–N=N–(1-hydroxy-8-amino-3,6-disulfo-naphthalen-2-yl)] | Cl | $B_1$ |
| 88e | [Structure: 3-sulfophenyl–N=N–(2-(2-hydroxyethoxy)-5-methylphenyl)–N=N–(1-hydroxy-8-amino-3,6-disulfo-naphthalen-2-yl)] | Cl | $B_1$ |
| 88f | [Structure: 2,5-disulfophenyl–N=N–(2-(2-hydroxyethoxy)-5-methylphenyl)–N=N–(1-hydroxy-7-amino-3-sulfo-naphthalen-2-yl)] | Cl | $B_1$ |

In Table 1, the variables $B_1$ to $B_{11}$ are the following diazo components or amines:

$B_1$: 4-aminophenyl-$SO_2$3$(CH_2)_2OSO_3H$ $B_2$: 4-aminophenyl-$CONH(CH_2)_2SO_2(CH_2)_2OSO_3H$ $B_3$: 2-amino-3-sulfo-phenyl-$SO_2(CH_2)_2OSO_3H$ B$_4$: 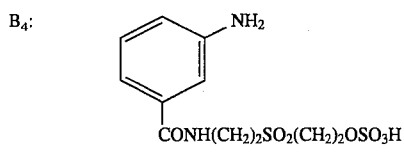

B$_5$: 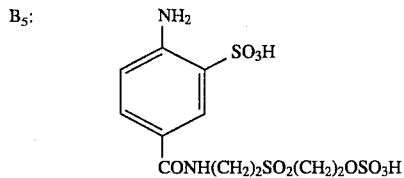

B$_6$: 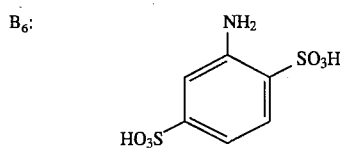

B$_7$: 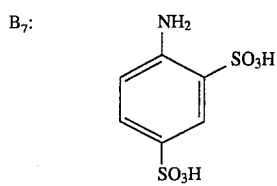

B$_8$: 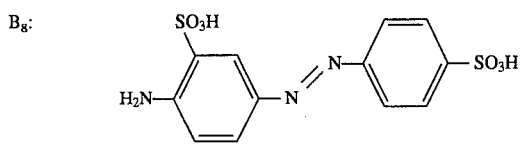

B$_9$: 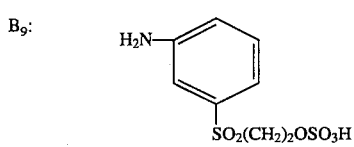

B$_{10}$: 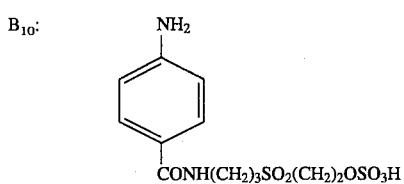

B$_{11}$: 

EXAMPLE 89

2 pans of dye according to Example 1 are dissolved in 400 pans of water; 1500 parts of a solution containing 53 g of sodium chloride per liter are added to the solution. 100 parts of a cotton fabric are introduced into this dyebath at 40° C. After 45 minutes, 100 parts of a solution containing 16 g of sodium hydroxide and 20 g of anhydrous Na$_2$CO$_3$ per liter are added. The temperature of the dyebath is kept at 40° C for a further 45 minutes. Thereafter, the golden yellow-coloured goods are rinsed, soaped at the boil with a nonionic detergent for a quarter of an hour, rinsed again and dried. The resulting goods are distinguished by very good fastnesses.

EXAMPLE 90

2 pans of the dye obtained according to Example 2 are dissolved in 400 parts of water; 1500 parts of a solution containing 53 g of sodium chloride per liter are added to the solution. 100 pans of a cotton fabric are introduced into this dyebath at 35° C. After 20 minutes, 100 parts of a solution containing 16 g of sodium hydroxide and 20 g of anhydrous Na$_2$CO$_3$ per liter are added. The temperature of the dyebath is kept at 35° C. for a further 15 minutes. Thereafter, the temperature is increased to 60° C. in the course of 20 minutes. The temperature is kept at 60° C for a further 35 minutes. Thereafter, the yellow-dyed goods are rinsed, soaped at the boil with a nonionic detergent for a quarter of an hour, rinsed again and dried. The resulting goods are distinguished by very good fastnesses.

EXAMPLE 91

8 pans of the dye obtained according to Example 3 are dissolved in 400 parts of water; 1400 parts of a solution containing 100 g of sodium sulfate per liter are added to the solution. 100 pans of a cotton fabric are introduced into this dyebath at 25° C. After 10 minutes, 200 parts of a solution containing 150 g of trisodium phosphate per liter are added. Thereafter, the temperature of the dyebath is increased to 60° C in the course of 10 minutes. The temperature is kept at 60° C for a further 90 minutes. Thereafter, the red-dyed goods are rinsed, soaped at the boil with a nonionic detergent for a quarter of an hour, rinsed again and dried. The resulting goods are distinguished by very good fastnesses.

EXAMPLE 92

4 pans of the dye obtained according to Example 1 are dissolved in 50 parts of water. 50 parts of a solution containing 5 g of sodium hydroxide and 20 g of anhydrous Na$_2$CO$_3$ per liter are added to the solution. A cotton fabric is padded with the resulting solution such that it increases by 70% of its weight, and is then wound up onto a roll. The cotton fabric is stored at room temperature in this manner for 3 hours. Thereafter, the golden yellow-dyed goods are rinsed, soaped at the boil with a nonionic detergent for a quarter of an hour, rinsed again and dried. The resulting goods are distinguished by very good fastnesses.

EXAMPLE 93

6 pans of the dye obtained according to Example 2 are dissolved in 50 parts of water. 50 parts of a solution containing 16 g of sodium hydroxide and 0.04 liter of water-glass (38° Bé) per liter are added to the solution. A cotton fabric is padded with the resulting solution such that it increases by 70% of its weight, and is then wound up onto a roll. The cotton fabric is stored at room temperature in this manner for 10 hours. Thereafter, the yellow-dyed goods are rinsed, soaped at the boil with a nonionic detergent for a quarter of an hour, rinsed again and dried. The resulting goods are distinguished by very good fastnesses.

EXAMPLE 94

2 parts of the dye obtained according to Example 3 are dissolved in 100 parts of water with addition of 0.5 part of sodium m-nitrobenzenesulfonate. A cotton fabric is impregnated with the resulting solution such that it increases by 75% of its weight, and is then dried. The fabric is then impregnated with a solution, warmed to 20° C., containing 4 g of sodium hydroxide and 300 g of sodium chloride per liter, and squeezed off to a weight increase of 75%, and the red dyeing is steamed at 100° to 102° C. for 30 seconds, rinsed, soaped in a 0.3% boiling solution of a nonionic detergent for a quarter of an hour, rinsed and dried. The resulting goods are distinguished by very good fastnesses.

EXAMPLE 95

3 parts of the dye obtained according to Example 1 are sprinkled, while stirring rapidly, into 100 parts of a stock thickener comprising 50 parts of 5% sodium alginate thickener, 27.8 parts of water, 20 pans of urea, 1 part of sodium m-nitrobenzenesulfonate and 1.2 parts of sodium bicarbonate. A cotton fabric is printed with the printing paste thus obtained and dried and the resulting printed material is steamed at 102° C. in saturated steam for 2 minutes. The golden yellow-printed fabric is then rinsed, if appropriate soaped at the boil and rinsed again, and subsequently dried. The resulting goods are distinguished by very good fastnesses.

EXAMPLE 96

5 pans of the dye obtained according to Example 1 are sprinkled, while stirring rapidly, into 100 parts of a stock thickener comprising 50 parts of 5% sodium alginate thickener, 36.5 parts of water, 10 pans of urea, 1 part of sodium m-nitrobenzenesulfonate and 2.5 parts of sodium bicarbonate. A cotton fabric is printed with the printing paste thus obtained, the stability of which meets technical requirements, and dried and the resulting golden yellow-printed material is steamed at 102° C. in saturated steam for 8 minutes. The printed fabric is then rinsed, if appropriate soaped at the boil and rinsed again, and subsequently dried. The resulting goods are distinguished by very good fastnesses.

What is claimed is:

1. A compound of the formula

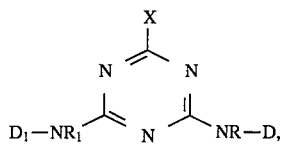

in which D is a radical of the formula

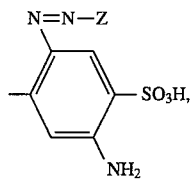

$D_1$ is the radical of a monoazo, polyazo, metal complex azo, anthraquinone, triphendioxazine, phthalocyanine or formazan chromophore, X is fluorine, chlorine, hydroxyl, amino, N-mono- or N,N-di-$C_1$—$C_4$alkylamino which are unsubstituted or substituted in the alkyl part by hydroxyl, phenylamino which is unsubstituted or substituted in the phenyl part by methyl, ethyl, methoxy, ethoxy, carboxyl, sulfo, chlorine or by a radical of the formula (5a) or (5b) mentioned below, methoxy, ethoxy, iso-propoxy, methylthio, ethylthio or morpholino R and $R_1$ independently of one another are each hydrogen or $C_1$—$C_4$alkyl which is unsubstituted or substituted by halogen, hydroxyl, cyano, $C_1$—$C_4$alkoxy, $C_1$—$C_4$alkoxycarbonyl, carboxyl, sulfo or sulfato and Z is a radical of the formula

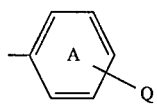 (3a)

or of the formula

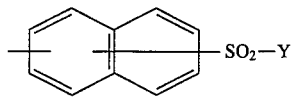 (3b)

Q is a radical of the formula

 (5a),

 (5b),

 (5c) or

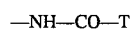 (5d)

Y is vinyl, β-bromo- or β-chloroethyl, β-acetoxyethyl, β-benzoyloxyethyl, β-phosphatoethyl, β-sulfatoethyl or β-thiosulfatoethyl, T is α,β-halopropionyl or β-haloacryloyl, n and m independently of one another are an integer from 1 to 6, p is the number 0 or 1, and the phenyl ring A is unsubstituted or further substituted by $C_1$—$C_4$alkyl, $C_1$—$C_4$alkoxy, halogen, carboxyl or sulfo.

2. A compound according to claim 1, in which R and $R_1$ independently of one another are each methyl, ethyl or hydrogen.

3. A compound according to claim 1, in which R and $R_1$ are each hydrogen.

4. A compound according to claim 1, in which X is chlorine, fluorine, amino, β-hydroxyethylamino, N,N-di-β-hydroxyethylamino, o-, m- or p-sulfophenylamino or morpholino.

5. A compound according to claim 1, in which Z is a radical of the formula (3a).

6. A compound according to claim 1, in which Q is a radical of the formula

 (5a),

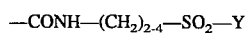 (5b'),

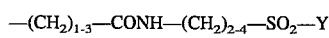 (5c') or

 (5d), in which Y is vinyl, β-bromo- or β-chloroethyl, β-acetoxyethyl, β-benzoyloxyethyl, β-phosphatoethyl, β-sulfatoethyl or β-thiosulfatoethyl and T is α,β-dibromopropionyl or α-bromoacryloyl.

7. A compound according to claim 1, in which Q is a radical of the formula

 (5a) or

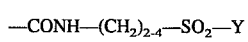 (5b"), in which Y is vinyl or β-sulfatoethyl.

8. A compound according to claim 1, in which Z is a phenyl radical of the formula (3a), which carries no further substituents apart from Q or is further substituted by 1 or 2 radicals from the group consisting of methyl, ethyl, methoxy, ethoxy, chlorine and sulfo, and in which Q is a radical of the formula $$—SO_2—Y \quad (5a),$$

$$—CONH—(CH_2)_{2-4}—SO_2—Y \quad (5b'),$$

$$—(CH_2)_{1-3}—CONH—(CH_2)_{2-4}—SO_2—Y \quad (5c') \text{ or}$$

$$—NH—CO—T \quad (5d),$$

in which Y is vinyl, β-bromo- or β-chloroethyl, β-acetoxyethyl, β-benzoyloxyethyl, β-phosphatoethyl, β-sulfatoethyl or β-thiosulfatoethyl and T is α,β-dibromopropionyl or α-bromoacryloyl.

9. A compound according to claim 1, in which Z is a radical of the formula

in which Q is a radical of the formula $$—SO_2—Y \quad (5a),$$

$$—CONH—(CH_2)_{2-4}—SO_2—Y \quad (5b'),$$

$$—(CH_2)_{1-3}—CONH—(CH_2)_{2-4}—SO_2—Y \quad (5c') \text{ or}$$

$$—NH—CO—T \quad (5d),$$

in which Y is vinyl, β-bromo- or β-chloroethyl, β-acetoxyethyl, β-benzoyloxyethyl, β-phosphatoethyl, β-sulfatoethyl or β-thiosulfatoethyl and T is α,β-dibromopropionyl or α-bromoacryloyl.

10. A compound according to claim 1, in which $D_1$ is the radical of a mono- or disazo dye.

11. A compound according to claim 1, in which $D_1$ is the radical of a mono- or disazo dye of the formula $$D^*—N=N—(M—N=N)_u—K— \quad (6a),$$

$$—D^*—N=N—(M—N=N)_u—K \quad (6b) \text{ or}$$

$$—D^*—N=N—(M—N=N)_u—K— \quad (6c),$$

or the radical of a disazo dye of the formula $$—D^*—N=N—K_1—N=N—D_1^* \quad (7a) \text{ or}$$

$$—D^*—N=N—K_1—N=N—D_1^*— \quad (7b),$$

or of a metal complex derived therefrom, in which D* and $D_1^*$ independently of one another are each the radical of a diazo component of the benzene or naphthalene series, M is the radical of a central component of the benzene or naphthalene series, K is the radical of a coupling component of the benzene, naphthalene, pyrazolone, 6-hydroxy-2-pyridone or acetoacetic acid arylamide series and $K_1$ is the radical of a coupling component of the naphthalene series; and in which D*, $D_1^*$, M, K and $K_1$ are in each case unsubstituted or substituted by hydroxyl, amino, methyl, ethyl, methoxy, ethoxy, 2-hydroxyethoxy, 2-sulfatoethoxy, alkanoylamino having 2 to 4 C atoms, benzoylamino, halogen or a fibre-reactive radical —$SO_2$—Y, u is 0 or 1 and D*, M and K or D*, $D_1^*$, M and $K_1$ in each case together contain at least two sulfo groups.

12. A compound according to claim 1 of the formula

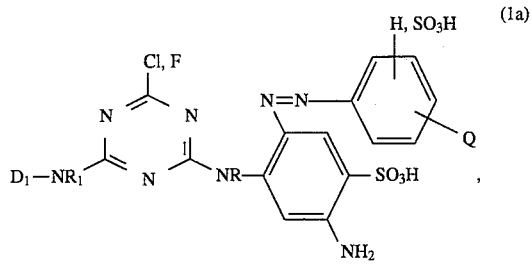

in which $D_1$ is the radical of a monoazo or disazo chromophore, R and $R_1$ independently of one another are each hydrogen, methyl or ethyl and Q is a radical of the formula $$—SO_2—Y \quad (5a) \text{ or}$$

$$—CONH—(CH_2)_{2-3}—SO_2—Y \quad (5b''),$$

in which Y is vinyl or β-sulfatoethyl.

13. A compound according to claim 12 of the formula (1 a), in which $D_1$ is a radical of the formula

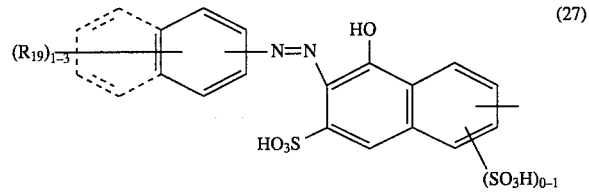

or

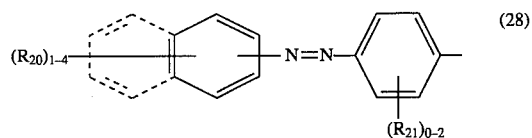

in which $(R_{19})_{1-3}$ is 1 to 3 identical or different substituents $R_{19}$ from the group consisting of sulfo, methoxy, methyl and the radical of the formula —$SO_2$—Y, in which Y is vinyl or β-sulfatoethyl, $(R_{20})_{1-4}$ is 1 to 4 identical or different substituents $R_{20}$ from the group consisting of sulfo, hydroxyl, benzoylamino, acetylamino and propionylamino and $(R_{21})_{0-2}$ is 0 to 2 identical or different substituents $R_{21}$ from the group consisting of methyl, methoxy, 2-hydroxyethoxy, 2-sulfatoethoxy, sulfo, acetylamino and ureido.

14. A compound according to claim 12 of the formula (1a), in which $D_1$ is a radical of the formula

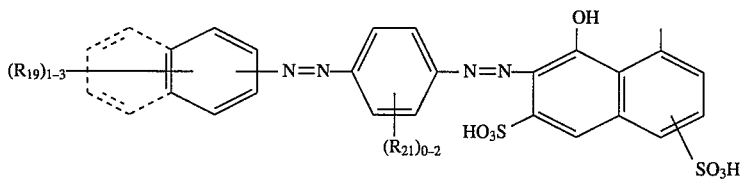

(29)

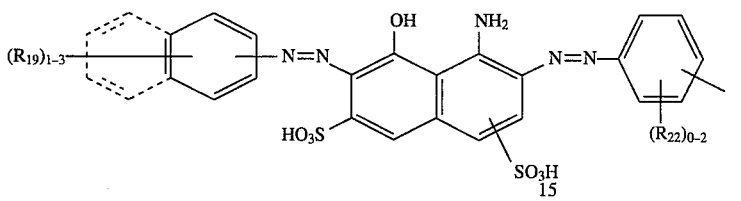

(30)

in which $(R_{19})_{1-3}$ is 1 to 3 identical or different substituents $R_{19}$ from the group consisting of sulfo, methoxy, methyl and the radical of the formula $-SO_2-Y$, in which Y is vinyl or β-sulfatoethyl, $(R_{21})_{0-2}$ is 0 to 2 identical or different substituents $R_{21}$ from the group consisting of methyl, methoxy, 2-hydroxyethoxy, 2-sulfatoethoxy, sulfo, acetylamino and ureido and $(R_{22})_{0-2}$ is 0 to 2 identical or different substituents $R_{22}$ from the group consisting of sulfo, chlorine, methyl and methoxy.

15. A process for dyeing and printing cellulosic fibre materials, which comprises treating the fibre materials with a dye of the formula (1) according to claim 1 in aqueous solution.

16. The process according to claim 15, wherein the cellulosic fibre material is cotton.

17. Dyeing and printing preparation comprising at least one dye of the formula (1) according to claim 1.

* * * * *